US006427234B1

(12) United States Patent
Chambers et al.

(10) Patent No.: US 6,427,234 B1
(45) Date of Patent: Jul. 30, 2002

(54) SYSTEM AND METHOD FOR PERFORMING SELECTIVE DYNAMIC COMPILATION USING RUN-TIME INFORMATION

(75) Inventors: Craig Chambers; Susan J. Eggers, both of Seattle; Brian K. Grant, Shoreline; Markus Mock; Matthai Philipose, both of Seattle, all of WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/330,359

(22) Filed: Jun. 11, 1999

Related U.S. Application Data

(60) Provisional application No. 60/089,129, filed on Jun. 11, 1998, provisional application No. 60/089,130, filed on Jun. 11, 1998, provisional application No. 60/089,131, filed on Jun. 11, 1998, and provisional application No. 60/089,185, filed on Jun. 12, 1998.

(51) Int. Cl.[7] .......... G06F 9/45
(52) U.S. Cl. .......... 717/140; 717/148; 717/153
(58) Field of Search .......... 717/5, 6, 8, 9, 717/140, 143, 148, 151, 153, 155; 708/200; 709/100; 340/825; 702/60; 714/707

(56) References Cited

U.S. PATENT DOCUMENTS

| | | | | | |
|---|---|---|---|---|---|
| 5,768,593 | A | * | 6/1998 | Walters et al. | 717/5 |
| 5,937,195 | A | * | 8/1999 | Ju et al. | 717/9 |
| 5,970,249 | A | * | 10/1999 | Holzle et al. | 717/5 |
| 5,999,734 | A | * | 12/1999 | Willis et al. | 717/6 |
| 6,011,916 | A | * | 1/2000 | Moore et al. | 717/104 |
| 6,014,518 | A | * | 1/2000 | Steensgaard | 717/154 |
| 6,044,221 | A | * | 3/2000 | Gupta et al. | 717/151 |
| 6,072,950 | A | * | 6/2000 | Steensgaard | 717/126 |
| 6,073,159 | A | * | 6/2000 | Emer et al. | 709/103 |
| 6,077,313 | A | * | 6/2000 | Ruf | 717/8 |
| 6,078,744 | A | * | 6/2000 | Wolczko et al. | 717/153 |
| 6,085,035 | A | * | 7/2000 | Unger | 717/5 |
| 6,113,651 | A | * | 9/2000 | Sakai et al. | 717/6 |
| 6,189,141 | B1 | * | 2/2001 | Benitez et al. | 717/153 |
| 6,223,339 | B1 | * | 4/2001 | Shah et al. | 717/158 |
| 6,253,373 | B1 | * | 6/2001 | Peri | 717/9 |

OTHER PUBLICATIONS

Calder et al, "Value Profiling", IEEE 1997, pp 259–269.*

Voss et al, ADAPT: automated de coupled adaptive program transformation, IEEE, pp 163–170, 2000.*

Masuhara et al, "Dynamic compilation of a reflective language using run time specialization", IEEE, pp 128–137, 2000.*

Whaley, "Partial method copilation using dynamic profile information", ACM OOPSLA, pp 166–179, Sep. 2001.*

(List continued on next page.)

*Primary Examiner*—Anil Khatri
(74) *Attorney, Agent, or Firm*—Ronald M. Anderson

(57) ABSTRACT

Selective dynamic compilation of source code is performed using run-time information. A system is disclosed that implements a declarative, annotation based dynamic compilation of the source code, employing a partial evaluation, binding-time analysis (BTA), and including program-point-specific polyvariant division and specialization and dynamic versions of traditional global and peephole optimizations. The system allows programmers to declaratively specify policies that govern the aggressiveness of specialization and caching, providing fine control over the dynamic compilation process. The policies include directions for controlling specialization at promotion points and merge points, and further define caching policies, and speculative-specialization policies. The system also enables programmers to specialize programs across arbitrary edges, both at traditional locations, such as procedure boundaries, but also within procedures. Programmers are enabled to conditionally specialize programs based on evaluation of arbitrary compile-time and run-time conditions.

20 Claims, 22 Drawing Sheets

OTHER PUBLICATIONS

Auslander, Joel: Philipose, Matthai: Chambers, Craig; Eggers, Susan J.; and Bershad, Brian N. "Fast Effective Dynamic Compilation.". Technical Report. Department of Computer Science and Engineering. University of Washington. PDLI 1996. 11pp.

Consel, Charles; and Noël, Francois. "A General Approach for Run–Time Specialization and its Application to C." Research Report. University of Rennes/Irisa. Campus Universitaire de Beaulieu. 35042 Rennes Cedex, France. 12pp.

Grant, Brian; Mock, Markus; Philipose, Matthai; Chambers, Craig; and Eggers, Susan J. "DyC: An Expressive Annotation–Directed Dynamic Compiler for C." Technical Report UW–CSE–97–03–03. Department of Computer Science and Engineering. University of Washington. Jun. 24, 1998. 22pp.

Grant, Brian; Mock, Markus; Philipose, Matthai; Chambers, Craig; and Eggers, Susan J. "Annotation–Directed Run–Time Specialization in C." Technical Report. Department of Computer Science and Engineering. University of Washington. PEPM 1997 Proceedings. 16pp.

Lee, Peter; and Leone, Mark. "Optimizing ML with Run–Time Code Generation." Research Report. School of Computer Science. Carnegie Mellon University. Pittsburgh, Pennsylvania 15213–3891. May 1996.

Noël, Francois; Hornof, Luke; Consel, Charles; and Lawall, Julia L. "Automatic, Template–Based Run–Time Specialization: Implementation and Experimental Study." Research Report. IRISA, Campus Universitaire de Beaulieu, 35042 Rennes Cedex, France. 11pp.

Poletto, Massimiliano; Hsieh, Wilson C.; Engler, Dawson R.; and Kaashoek, M. Frans. "'C and tcc: A Language and Compiler for Dynamic Code Generation." Research Report. Advanced Research Projects Agency. 43pp.

Volanschi, Eugen N.; Consel, Charles; Muller, Gilles; and Cowan, Crispin. Declarative Specialization of Object–Oriented Programs. Technical Report RR–3118. IRISA/INRIA University of Rennes Campus Beaulieu, F–35042 Rennes Cedex, France and Department of Computer Science and Engineering. Oregon Graduate Institute fo Science and Technology. INRIA, 1997. 15pp.

* cited by examiner-

```
Specialize(unit:Unit,
           context:Context,
           backpatch_addr:Addr):Addr {
        /* see if we've already specialized this unit for
           this particular context */
        (found:bool, start_addr:Addr) :=
          CacheLookup(unit, context);
       if not found then
        /* need to produce & cache the specialization */
        (start_addr,
         edge_contexts:List<Context>,
         edge_addrs:List<Addr>) :=
          unit.ReduceAndResidualize(context);
        CacheStore(unit, context, start_addr);
        /* see how to handle each successor of the
           specialized unit */
        foreach edge:UnitEdge,
                edge_context:Context,
                edge_addr:Addr
          in unit.edges, edge_contexts, edge_addrs do
         if edge.eager_specialize then
          /* eagerly specialize the successor now */
          Specialize(edge.target_unit,
                     edge_context,
                     edge_addr);
         else
          /* lazily specialize the successor by
             emitting code to compute the values of
             promoted variables and then call the
             specializer with the revised context */
          addr:Addr :=
           edge.ResolvePromotions(edge_context);
          Backpatch(edge_addr, addr);
          patch_addr:Addr :=
           if edge.one_time_lazy
           then edge_addr else NULL;
          Emit("pc := Specialize(`edge.target_unit`,
                                 promoted_context,
                                 `patch_addr`)");
          Emit("jump pc");
         endif
        endfor
       endif
       /* make the predecessor unit branch to this code */
       Backpatch(backpatch_addr, start_addr);
       return start_addr;
}
```

*FIG. 3*

```
CacheLookup(unit:Unit, context:Context)
          :(found:bool, start_addr:Addr) {
        if CacheAllUnchecked ∈ unit.cache_policies then
         /* always produce a new specialization */
         return (false, NULL);
        else
         /* first index on CacheAll values */
         let cache_alls :=
          elements of context with CacheAll policy;
         (found, sub_cache) :=
          cache.lookup(unit.id, cache_alls);
         if not found then return (false, NULL);
         /* then index on CacheOne values
            in nested cache */
         let cache_ones :=
          elements of context with CacheOne policy;
         (found, start_addr) :=
          sub_cache.lookup(cache_ones);
         /* no need to index on CacheOneUnchecked */
         return (found, start_addr);
        endif
}
CacheStore(unit:Unit, context:Context,
           start_addr:Addr):void {
        if CacheAllUnchecked ∈ unit.cache_policies then
         /* don't store it, since we won't reuse it */
        else
         /* first index on CacheAll values */
         let cache_alls :=
          elements of context with CacheAll policy;
         (found, sub_cache) :=
          cache.lookup(unit.id, cache_alls);
         if not found then
          sub_cache := new SubCache;
          cache.add(unit.id, cache_alls, sub_cache);
         endif
         /* then index on CacheOne values
            in nested cache */
         let cache_ones :=
          elements of context with CacheOne policy;
         /* store the new specialization in the cache,
            replacing any there previously */
         sub_cache.replace(cache_ones, start_addr);
        endif
}
Backpatch(source:Addr, target:Addr):void {
        /* if source != NULL, then backpatch the branch
           instruction at source to jump to target */
}
Emit(instruction:Code) {
        /* append a single instruction to the current
           code-generation point */
}
```

*FIG. 4*

```
type Context = Tuple<Value>;
class Unit {
        id:int,
        cache_policies:Tuple<CachePolicy>;
        edges:List<UnitEdge>;
        ReduceAndResidualize(context:Context)
                            :(start_addr:Addr,
                                out_contexts:List<Context>,
                                edge_addrs:List<Addr>);
        /* Take the the values of the static vars and
           produce specialized code for the unit.
           Return the address of the start of the unit's
           specialized code and, for each successor unit,
           the new values of the static variables at that
           edge and the address of the exit point in the
           specialized code for the unit */
}
class UnitEdge {
        target_unit:Unit;
        eager_specialize:bool;
        one_time_lazy:bool;
        ResolvePromotions(context:Context):Addr;
         /* Generate code to extract the current run-time
            values of any static variables being promoted
            at this edge, updating the input
            context and leaving the result in the
            "promoted_context" run-time variable.
            Return the address of the start of the
            generated code. */
}
enum CachePolicy {
        CacheAll, CacheAllUnchecked,
        CacheOne, CacheOneUnchecked
}
```

*FIG. 5*

Domains:

$BTA \equiv Division \rightarrow DivisionInfo$ $DivisionInfo \equiv StaticVarInfo \times Promotions \times DiscordantVars \times Demotions$ $Division \equiv Var \rightarrow Policies$ Var ≡ finite set of all variables in scope of procedure being compiled $Policies \equiv DivisionPolicy \times SpecializationPolicy \times PromotionPolicy \times MergeCachingPolicy \times PromotionCachingPolicy \times LazinessPolicy$ DivisionPolicy ≡ {PolyDivision, MonoDivision}

SpecializtionPolicy ≡ {PolySpecialization, MonoSpecialization}

PromotionPolicy ≡ {AutoPromote, ManualPromote}

MergeCachingPolicy ≡ {CacheAllUnchecked, CacheAll, CacheOne, CacheOneUnchecked}

PromotionCachingPolicy ≡ {CacheAllUnchecked, CacheAll, CacheOne, CacheOneUnchecked}

LazinessPolicy ≡ {Lazy, SpecializeLazy, LoopSpecializeLazy, Eager}

$StaticVarInfo \equiv Var \rightarrow CachingPolicy \times SourceRoots$

CachingPolicy ≡ {CacheAllUnchecked, CacheAll, CacheOne, CacheOneUnchecked}

SourceRoots ≡ Pow(Var)

Promotions ≡ Pow(Var)

Demotions ≡ Pow(Var)

DiscordantVars ≡ Pow(Var)

LiveVars ≡ Pow(Var)

UsedVars ≡ Pow(Var)

MayDefVars ≡ Pow(Var)

$Specializations \equiv Proc \rightarrow SpecializationInfo$

Proc ≡ finite set of all procedures in scope of function being compiled $SpecializationInfo \equiv IsConstant \times Divisions$ IsConstant ≡ {Constant, NotConstant}

Divisions ≡ Pow(Division)

*FIG. 7*

Constraints:

BTALegal(bta:BTA) ≡
 LegalDivisions(dom(bta)) ∧
 ∀(d,i)∈bta.
  StaticVars(i)⊇dom(d) ∧
  ∀v∈StaticVars(i).
   (SourceRoots(v, i)⊆dom(d) ∧
   v∉dom(d) ⇒
    CachingPolicy(StaticVarInfo(i)(v)) =
     CacheOneUnchecked) ∧
  Promotions(i)⊆dom(d) ∧
  DiscordantVars(i)⊆PolySpecializationVars(d)
LegalDivisions(ds:Pow(Division)) ≡
 $\forall d_1, d_2 \in ds.\ d_1 = d_2 \vee$ SeparateDivisions($d_1$, $d_2$)
SeparateDivisions($d_1$:Division, $d_2$:Division) ≡
 PolyDivisionVars($d_1$)≠PolyDivisionVars($d_2$) ∨
 ∃v∈PolyDivisionVars($d_1$). $d_1(v) \neq d_2(v)$
PolyDivisionVars(d:Division) ≡
 { v∈dom(d) | DivisionPolicy(d(v)) = PolyDivision }
PolySpecializationVars(d:Division) ≡
 { v∈dom(d) | SpecializationPolicy(d(v)) = PolySpecialization }
StaticVars(i:DivisionInfo) ≡ dom(StaticVarInfo(i))
SourceRoots(v:Var, i:DivisionInfo) ≡
 if v∈StaticVars(i) then SourceRoots(StaticVarInfo(i)(v)) else ∅

*FIG. 8*

Grammar:

```
Node ::=          OpNode | MergeNode | BranchNode |
                  EntryNode | ReturnNode

OpNode ::=        MakeStaticNode | MakeDynamicNode |
                  ConstNode | MoveNode | UnaryNode | BinaryNode |
                  LoadNode | StaticLoadNode | StoreNode | CallNode

MakeStaticNode    ::= make_static(Var:Policies)
MakeDynamicNode   ::= make_dynamic(Var)

ConstNode         ::= Var := Const
MoveNode          ::= Var := Var
UnaryNode         ::= Var := UnaryOp Var
BinaryNode        ::= Var := Var BinaryOp Var
LoadNode          ::= Var := * Var
StaticLoadNode    ::= Var := @* Var
StoreNode         ::= * Var := Var
CallNode          ::= Var := Proc(Var, ..., Var)

MergeNode         ::= merge(Var, ..., Var)

BranchNode        ::= test Var

EntryNode         ::= enter Proc

ReturnNode        ::= return Var
```

*FIG. 9*

$BTA_{\mathrm{OpNode}}$ : OpNode→LiveVars→UsedVars→MayDefVars
→Specializations→BTA→BTA $BTA_{\mathrm{OpNode}}$ [[`make_static(x:p)`]] lvs uvs mds sp bta ≡
Merge(lvs, { ($d_{out}$, $i_{out}$ ) |
(d,i) ∈ bta ∧
$d_{out}$ = ForgetDeadVars(uvs, d – { (x',p')∈d | x' = x } ∪ {(x,p)},
StaticVarInfo(i)) ∧
let i' = MakeStatic(x,$d_{out}$, i[DiscordantVars→∅]) in
$i_{out}$ = ComputeDemoted(lvs,$d_{out}$, i, i')})

$BTA_{\mathrm{OpNode}}$ [[`make_dynamic(x)`]] lvs uvs mds sp bta ≡
Merge(lvs, { ($d_{out}$, $i_{out}$ ) |
(d,i) ∈ bta ∧
$d_{out}$ = ForgetDeadVars(uvs, d – { (x',p')∈d | x' = x },
StaticVarInfo(i)) ∧
let i' = i[DiscordantVars→∅] in
$i_{out}$ = ComputeDemoted(lvs, $d_{out}$, i, i')})

$BTA_{\mathrm{OpNode}}$ [[`x := k`]] lvs uvs mds sp bta ≡
Merge(lvs, { ($d_{out}$, $i_{out}$ ) |
(d,i) ∈ bta ∧
($d_{out}$, $i_{out}$ ) = ProcessAssignment(lvs, x, true, ∅, uvs,
mds, d, i)})

$BTA_{\mathrm{OpNode}}$ [[`x := y`]] lvs uvs mds sp bta ≡
Merge(lvs, { ($d_{out}$, $i_{out}$ ) |
(d,i) ∈ bta ∧
($d_{out}$, $i_{out}$ ) = ProcessAssignment(lvs,
x, y∈StaticVars(i), SourceRoots(y,i), uvs, mds, d, i)})

$BTA_{\mathrm{OpNode}}$ [[`x := op y`]] lvs uvs mds sp bta ≡
Merge(lvs, { ($d_{out}$, $i_{out}$ ) |
(d,i) ∈ bta ∧
($d_{out}$, $i_{out}$ ) = ProcessAssignment(lvs,
x, y∈StaticVars(i) ∧ Pure(op), SourceRoots(y,i),
uvs, mds, d, i)})

$BTA_{\mathrm{OpNode}}$ [[`x := y op z`]] lvs uvs mds sp bta ≡
Merge(lvs, { ($d_{out}$, $i_{out}$ ) |
(d,i) ∈ bta ∧
($d_{out}$, $i_{out}$ ) = ProcessAssignment(lvs,
x,{y,z}⊆StaticVars(i) ∧ Pure(op),
SourceRoots(y,i) ∪ SourceRoots(z,i), uvs, mds, d, i)})

*FIG. 10A*

$BTA_{\text{OpNode}}$ [[`x := *p`]] lvs uvs mds sp bta ≡
Merge(lvs, { ($d_{out}$, $i_{out}$) |
(d,i) ∈ bta ∧
($d_{out}$, $i_{out}$) = ProcessAssignment(lvs, x, false, ∅, uvs,
mds, d, i)})

$BTA_{\text{OpNode}}$ [[`x := @* p`]] lvs uvs mds sp bta ≡
Merge(lvs, { ($d_{out}$, $i_{out}$) |
(d,i) ∈ bta ∧
($d_{out}$, $i_{out}$) = ProcessAssignment(lvs,
x, p∈StaticVars(i), SourceRoots(p,i), uvs, mds, d, i)})

$BTA_{\text{OpNode}}$ [[`*p := y`]] lvs uvs mds sp bta ≡
Merge(lvs, { ($d_{out}$, $i_{out}$) |
(d,i) ∈ bta ∧
($d_{out}$, $i_{out}$) = ProcessStmt(lvs, ∅, uvs, mds, d, i))}

$BTA_{\text{OpNode}}$ [[`x := f(y` $_1$ `, . . . ,y` $_n$ `)`]] lvs uvs mds sp bta ≡
Merge(lvs, { ($d_{out}$, $i_{out}$) |
(d,i) ∈ bta ∧
($d_{out}$, $i_{out}$) = ProcessAssignment(lvs, x,
{$y_1$ ,...,$y_n$ }⊆StaticVars(i) ∧
f∈dom(sp) ∧ IsConstant(sp(f)) = Constant,
∪$y_i$ ∈ {$y_1$,...,$y_n$} SourceRoots($y_i$ ,i), uvs, mds, d, i)})

$BTA_{\text{Entry}}$ : EntryNode→LiveVars→UsedVars→Specializations→BTA $BTA_{\text{Entry}}$ [[`enter P`]] lvs uvs sp ≡
let ds = (if P∈dom(sp) then Divisions(sp(P)) else ∅) ∪ {∅} in
Merge(lvs, { (d, (s, ∅, ∅, ∅)) |
d'∈ds ∧
d = ForgetDeadVars(uvs, d', ∅) ∧
s = { InitialBinding(v, d) | v∈dom(d) } })

$BTA_{\text{Branch}}$ : BranchNode→LiveVars×LiveVars→UsedVars×UsedVars
→MayDefVars×MayDefVars→Specializations→BTA→BTA×BTA $BTA_{\text{Branch}}$ [[`test x`]] (lvs 1 ,lvs 2 ) (uvs 1 ,uvs 2 ) (mds 1 ,mds 2 ) sp bta ≡
(Merge(lvs 1 , { ($d_{out}$, $i_{out}$) |
(d,i) ∈ bta ∧ ($d_{out}$, $i_{out}$) = ProcessStmt(lvs 1 , ∅, uvs 1 , mds 1 , d, i)}),
Merge(lvs 2 , { ($d_{out}$, $i_{out}$) |
(d,i) ∈ bta ∧ ($d_{out}$, $i_{out}$) = ProcessStmt(lvs 2 , ∅, uvs 2 , mds 2 , d, i)}))

*FIG. 10B*

$BTA_{\text{Merge}}$ : MergeNode→LiveVars→UsedVars→MayDefVars
→Specializations→Pow(BTA)→BTA $BTA_{\text{Merge}}$ [[`merge(`$x_1$ `, . . . ,` $x_n$ `)`]] lvs uvs mds sp btas ≡
let bta = ∪ btas in
Merge(lvs, { ($d_{out}$, $i_{out}$ ) |
(d,i) ∈ bta ∧
pvs = $x_1$ ,...,$x_n$ } ∩ PolySpecializationVars(d) ∩ lvs ∧
smvs = {x | x∈{$x_1$ ,...,$x_n$ }∧ merge forx is static in division d}∧
mvs = ({$x_1$ ,...,$x_n$ } – pvs – smvs) ∩ lvs ∧
$d_{out}$ = ForgetDeadVars(uvs, d – { (x,p)∈d | x∈mvs },
StaticVarInfo(i)) ∧
si = KillDanglingDerivedVars(d,StaticVarInfo(i),mvs) –
{ (v, vp) ∈ StaticVarInfo(i) | v∈mvs } ∧
si' = si – { (v, vp) ∈ si | v∈pvs } ∪
{ (v, (mp, {v})) | (v,p)∈$d_{out}$ ∧ v∈pvs ∧
mp = MergeCachingPolicy(p) } ∧
$i_{out}$ = ComputeDemoted(lvs,$d_{out}$ , i,(si', ∅, pvs, ∅)) } )

*FIG. 10C*

```
Merge(lvs:LiveVars, bta:BTA):BTA ≡
  MergePartitions(lvs, Partition(bta))

Partition(bta:BTA):Pow(BTA) ≡
  { { (d,i)∈bta | DivisionSelector(d) = ds } |
    ds ∈DivisionSelectors(bta) }

DivisionSelectors(bta:BTA):Divisions ≡
  { DivisionSelector(d) | (d,i)∈bta }

DivisionSelector(d:Division):Division ≡
  { (v,p)∈d | v∈PolyDivisionVars(d) }

MergePartitions(lvs:LiveVars, btas:Pow(BTA)):BTA ≡
  { (d,i) | bta ∈ btas ∧
        d = ∩Division dom(bta) ∧
        i = FilterStaticVars(lvs, d, ∩DivisionInfo range(bta)) }

FilterStaticVars(lvs:LiveVars, d:Division, i:DivisionInfo
                    ):DivisionInfo ≡
  if dom(d) = ∅ then i[StaticVarInfo→∅]
  else let si = { (v, (p,rvs))∈StaticVarInfo(i) |
                      v∈lvs ∪Derived(v,StaticVarinfo(i)} in
    i[StaticVarInfo→
      KillDanglingDerivedVars(d,si,{ r | (v, (p, rvs)) ∈ si ∧
                                          r∈rvs−dom(d) })]

Derived(v: Var, si: StaticVarInfo):Pow(Var) ≡
  {v' | (v', (p', rvs')) ∈si ∧ v ∈rvs'∧ v ≠ v' }

ComputeDemoted(lvs:LiveVars, d: Division, i, i':DivisionInfo
               ): DivisionInfo ≡
  let svf = StaticVars(FilterStaticVars(lvs, d, i'))
      svi = StaticVars(i), svo = StaticVars(i') in
        i'[DemotedVars→(svi − svo) ∪ (svo − svf)]

InitialBinding(v:Var, d:Division
                 ):Var × (CachingPolicy × SourceRoots) ≡
  (v, (PromotionCachingPolicy(d(v)), {v}))
MakeStatic(v:Var, d:Division, i:DivisionInfo):DivisionInfo ≡
  if v∈StaticVars(i) then i
  else (StaticVarInfo(i) ∪ {InitialBinding(v, d)}, {v}, ∅, ∅)
Pure(op:Op):bool ≡
```
*returns true iff* op *is idempotent and cannot raise an exception or fault; most operators are pure;* div *and* malloc *are canonical impure operators*

*FIG. 11A*

```
ProcessAssignment(lvs:LiveVars, v:Var,
                    rhs_is_static:bool, rvs:SourceRoots,
                    uvs:UsedVars, mds:MayDefVars,
                    d:Division, i:DivisionInfo
                    ):Division × DivisionInfo ≡
        if rhs_is_static
        then ProcessStmt({(lvs, v,(CacheOneUnchecked,rvs))}, mds,
                    uvs, d, i)
        else ProcessStmt(lvs, ∅, mds ∪ {v}, uvs, d, i)
ProcessStmt(lvs:LiveVars, static_assigns:StaticVarInfo,
                uvs:UsedVars, dyn_assigns:Pow(Var),
                d:Division, i:DivisionInfo
                ):Division × DivisionInfo ≡
        (d_out,i_out) where
        ps = MayPromotedVars(d, dyn_assigns)
        d' = ForgetDynVars(dyn_assigns − ps, d)
        si = StaticVarInfo(i)
        si' = si − { (v,vi)∈si | v∈dom(static_assigns) } ∪ static_assigns
        si_out = ProcessDynAssigns(
                si', dom(static_assigns), dyn_assigns, d')
        d_out = ForgetDeadVars(uvs, d', si_out)
        ps_out = ps ∩ dom(d_out)
        i_out = ComputeDemoted(lvs, d_out, i, (si_out, ps_out, ∅, ∅))
MayPromotedVars(d:Division, vs:Pow(Var)):Promotions ≡
        { v∈vs | v∈dom(d) ∧ PromotionPolicy(d(v)) = AutoPromote }
KillDanglingDerivedVars(d:Division,si:StaticVarInfo,
                    mvs:Pow(Var)):StaticVarInfo ≡
        { (v, (p,rvs))∈si | (rvs∩mvs)=∅ } ∪
        {(v, (p',rvs')) | (v, (p,rvs))∈si ∧ (rvs∩mvs)≠∅ ∧ v∈dom(d) ∧
                rvs'=(rvs-mvs)∪{v} ∧
                p'=p ∩CachingPolicy
                 (∩CachingPolicy v'∈rvs∩mvs CachingPolicy(si(v'))) }
ProcessDynAssigns(si:StaticVarInfo, svs:Pow(Var), dvs:Pow(Var),
                 d:Division):StaticVarInfo ≡
        KillDanglingDerivedVars(d,si,(svs∪dvs)) − { (v, vp)∈si | v∈dvs }
         ∪ { InitialBinding(v, d) | v∈dom(d) ∧ v∈dvs }
ForgetDeadVars(uvs:UsedVars, d:Division,si:StaticVarInfo
                ):Division ≡
        { (v,p)∈d | v∈uvs ∨ v∈∪v'∈dom(si) SourceRoots(si(v'))}
ForgetDynVars(vs:Pow(Var), d:Division):Division ≡
        { (v,p)∈d | v∉vs }
```

*FIG. 11B*

| PROGRAM | DESCRIPTION | ANNOTATED STATIC VARIABLES | VALUES OF STATIC VARIABLES | TOTAL SIZE (LINES) | NUMBER & SIZE OF DYNAMICALLY COMPILED FUNCTIONS | | |
|---|---|---|---|---|---|---|---|
| | | | | | # | LINES | INSTRUCTIONS |
| **APPLICATIONS** | | | | | | | |
| DINERO | CACHE SIMULATOR | CACHE CONFIGURATION PARAMETERS | 8KB I/D, DIRECT-MAPPED, 32B BLOCKS | 3,317 | 8 | 389 | 1624 |
| M88KSIM | MOTOROLA 88000 SIMULATOR | AN ARRAY OF BREAKPOINTS | NO BREAKPOINTS | 12,531 | 1 | 14 | 145 |
| MIPSI | MIPS R3000 SUMULATOR | ITS INPUT PROGRAM | BUBBLE SORT | 3,417 | 1 | 400 | 2884 |
| **KERNALS** | | | | | | | |
| BINARY | BINARY SEARCH OVER AN ARRAY | THE INPUT ARRAY AND ITS CONTENTS | 16 INTEGERS | 147 | 1 | 19 | 134 |
| CHEBYSHEV | POLYNOMIAL FUNCTION APPROXIMATION | THE DEGREE OF THE POLYNOMIAL | 10 | 145 | 1 | 19 | 146 |
| QUERY | TESTS DATABASE ENTRY FOR MATCH | A QUERY | 7 COMPARISONS | 149 | 1 | 24 | 272 |
| ROMBERG | FUNCTION INTEGRATION BY ITERATION | THE ITERATION BOUND | 6 | 158 | 1 | 24 | 301 |

*FIG. 23*

| DYNAMIC REGION | ASYMPTOTIC SPEEDUP | BREAK-EVEN-POINT | DC OVERHEAD (CYCLES/INSTRUCTION GENERATED) | NUMBER OF INSTRUCTIONS GENERATED |
|---|---|---|---|---|
| DINERO: MAINLOOP | 1.7 | 1 INVOCATION (3524 MEMORY REFERENCES | 334 | 634 |
| M88KSIM: CKBRKPTS | 3.7 | 28 BREAKPOINT CHECKS | 365 | 6 |
| MIPSI: RUN | 5.0 | 1 INVOCATION (484634 INSTRUCTIONS) | 207 | 36614 |
| BINARY | 1.8 | 836 SEARCHES | 72 | 304 |
| CHEBYSHEV | 6.3 | 2 INTERPOLATIONS | 31 | 807 |
| QUERY | 1.4 | 259 DATABASE ENTRY COMPARISONS | 53 | 71 |
| ROMBERG | 1.3 | 16 INTEGRATIONS | 13 | 1206 |

*FIG. 24*

SYSTEM AND METHOD FOR PERFORMING SELECTIVE DYNAMIC COMPILATION USING RUN-TIME INFORMATION

RELATED APPLICATION

This application is based on prior copending provisional application Serial Nos. 60/089,129; 60/089,130; and 60/089,131; all of which were filed on Jun. 11, 1998; and on provisional application Serial No. 60/089,185, filed on Jun. 12, 1998; the benefit of the filing dates of which is hereby claimed under 35 U.S.C. § 119(e).

FIELD OF THE INVENTION

The present invention generally concerns compilers for generating computer code, and more particularly, dynamic-compilation systems that are used to generate executable instructions for selected parts of computer programs at run time.

BACKGROUND OF THE INVENTION

Selective dynamic compilation transforms selected parts of computer programs at run time, using information available only at run time to optimize execution of the programs. A compilation strategy is employed during selective dynamic compilation to enable the code-compilation process to be completed in stages—at static compile time, at link time, at load time, and (on demand) at run time. By delaying a portion of the compilation process, it is possible to take advantage of information available only at the later stages, with the goal of improving performance of the resulting code.

Postponing a portion of the compilation process until run time is called selective dynamic compilation and should not be confused with complete dynamic compilation, wherein all program compilation is done at run time. (Recently introduced "just in time" compilers for JAVA are examples of complete dynamic compilers.) As used in this specification and in the claims that follow, the term "dynamic compilation" refers only to selective dynamic compilation and not to complete dynamic compilation.

Value-specific selective dynamic compilers derive their benefits by optimizing parts of programs for particular run-time computed values of invariant variables and data structures (called run-time constants), in effect, performing a kind of dynamic constant propagation and folding. Programs and program portions that are suitable for selective dynamic compilation include: (a) highly parameterized computations that use a significant amount of time consulting parameters, but often run using the same parameter settings; (b) programs with many similar subcomputations; (c) programs of highly interpretive nature, e.g., circuit and other simulators, where specializations remove the time to scan the object being simulated; and (d) database query search algorithm. Additional proposed applications for selective, value-specific dynamic compilation include specializing architectural simulators for the configuration being simulated, language interpreters for the program being interpreted, rendering engines for scene-specific state variables, numeric programs for dimensions and values of frequently used arrays, and critical paths in operating systems for the type of data being processed and the current state of the system. Trends in software engineering that are moving toward dynamic reconfigurability, such as parameterization for reuse and portability across different hardware architectures, also imply a promising role for dynamic compilation.

The principle challenge and trade-off in selective dynamic compilation is achieving high-quality dynamically generated code at low run-time cost, since the time to perform run-time compilation and optimization must be recovered before any benefit from dynamic compilation can be obtained. Consequently, a key design issue in developing an effective dynamic-compilation system is the method for determining where, when, and on what run time state to apply dynamic compilation. Ideally, the compiler would make these decisions automatically, as in other (static) compiler optimizations; however, this ideal is beyond current state of the art for general-purpose systems.

Instead, current dynamic-compilation systems rely on some form of programmer direction to indicate where dynamic compilation is to be applied to program code. Some systems take an imperative or operational approach to user direction, requiring the user to explicitly construct, compose, and compile program fragments at run time. Imperative approaches can express a wide range of optimizations, but impose a substantial burden on the programmer to manually program the optimizations. Moreover, such a programming burden makes it difficult to effectively apply imperative approaches to large applications. An example of an imperative system, called "C," is described by D. R. Engler, W. C. Hsieh, and M. F. Kaashoek in "C: A language for high-level, efficient, and machine-independent dynamic code generation," Conference Record of POPL'96: 23rd ACM SIGPLAN_SIGACT Symposium on Principles of Programming Languages, pp. 131–144, January 1996.

As an alternative to the imperative approach, several dynamic-compilation systems take a declarative or transformational approach, with user annotations guiding the dynamic compilation process. Examples of declarative systems include "Tempo," described by C. Consel and F. Nöel in "A general approach for run-time specialization and its application to C," Conference Record of POPL'96: $23_{rd}$ ACM SIGPLAN_SIGACT Symposium on Principles of Programming Languages, pp. 131–144, January 1996; and "Fabius," described by M. Leone and P. Lee in "Optimizing ML with Run-Time Code Generation, Proceedings of the ACM SIGPLAN '96 Conference on Programming Language Design and Implementation, pages 137–148, May 1996. Each of these declarative approaches adapts ideas from partial evaluation, expressing dynamic compilation as run-time specialization, where known or static values correspond to a run-time state for which programs are specialized. To keep dynamic compilation costs low, these systems preplan the possible effects of dynamic optimizations statically, producing a specialized dynamic compiler tuned to the particular part of the program being dynamically optimized; this sort of preplanning is known as staging the optimization. Declarative approaches offer the advantages of an easier interface to dynamic compilation for the programmer and easier program understanding and debugging. However, declarative systems usually offer less expressiveness and control over the dynamic compilation process than do imperative systems. Furthermore, the limitations of previous declarative systems have prevented them from coping effectively with the more involved patterns of control and data flow found in some small and most large applications, causing them to miss optimization opportunities or forcing substantial rewriting of the code to fit the limitations of the system. It would therefore be desirable to develop a system and associated programming interface that provides the ease of use of a declarative system, with the control and flexibility of an imperative-type system.

The cost of dynamic code generation must be recovered before benefits from specialized code can be realized. One way to recover this cost is to reuse the specialized code when a program's execution path reaches the same point. Unfortunately, it is not always possible to do this, because the values of the static variables for which the code was specialized may have changed, rendering the specialized code unreusable. Reuse is achieved by caching the specialized code when it is dynamically generated and then doing a cache lookup, based on the values of the static variables, to retrieve it when the code is executed again. Some prior art systems cache specialized code only at function entry points. This limitation restricts the granularity of code specialization and reuse to entire functions, eliminating opportunities for reusing portions of a function. Other systems aggressively reuse code by caching it at every specialized jump target. However, such frequent cache lookups cause unacceptable overhead in run-time code. It would therefore be desirable to produce a system that most efficiently uses caching of specialized code portions and associated cache lookups.

Another shortfall of the prior art systems is that they do not provide on-demand specialization at a sub-function level. On-demand specialization, also known as lazy specialization, enables specialization to be deferred until a portion of the program to be specialized is assured of being executed, thereby reducing both the amount of specialized code produced and the overhead required to produce such code. Furthermore, on-demand specialization within a function enables an aggressive form of loop specialization, called complete loop unrolling, wherein each iteration of a loop is specialized on demand, as it is about to execute. In the absence of on-demand specialization, specialization by complete loop unrolling is not guaranteed to terminate. In most prior art systems, on-demand specialization is restricted to specializing entire functions on different values of function arguments. However, it is often beneficial to lazily specialize parts of a program smaller than a function. Such parts may include a rarely taken side of a conditional branch, separate iterations of a loop, or a fragment of code within a function that uses a static variable.

Although there are some prior art systems that allow a limited set of optimizations other than specialization to be performed lazily on arbitrary parts of a program, these prior art systems provide unsuitable results. When these systems resume optimization after the deferral, they cannot: (a) use optimization information computed before the deferral; (b) produce optimized code for different instances of this optimization information; or, (c) defer optimization again when optimizing the initial deferred part of the program. Without these capabilities, these systems cannot add to their repertoire of optimizations specialization that specializes effectively across a deferral, specializes on promoted static variables, or provides complete loop-unrolling that is guaranteed to terminate. It would therefore be desirable to provide a system that supports on-demand specialization at arbitrary program points, since such on-demand specialization can be used to provide several performance benefits, including specialization at a sub-function level and support for complete loop unrolling.

A further limitation of the prior art systems relates to conditional specialization. Sometimes dynamic program optimizations improve performance, and at other times, they degrade it. Therefore, a programmer may wish to apply an optimization conditionally, that is, only when it can be ascertained that the optimization will benefit performance. Two opposing factors usually determine whether conditionally applying an optimization will be beneficial: the reliability of the condition, and the run-time overhead of applying the optimization. A condition that can formulate conditions based only on compile-time information is often unreliable. On the other hand, compile-time conditions incur no run-time overhead. Run-time conditions are more reliable, because more information about the program's state and behavior is available at run time. Most prior art systems either do not support conditional specialization, or only provide conditional specialization based on compile-time conditions. It would be advantageous to provide a system that could support both compile-time and run-time specialization. Furthermore, it would be desirable to provide a system that enables a programmer to apply conditional specialization through an easy to use programming interface.

SUMMARY OF THE INVENTION

The present invention is directed to a system and method for performing selective dynamic compilation using run-time information that overcomes many of the limitations of the prior art. The system, called "DyC," implements a declarative, annotation based dynamic compilation and contains a sophisticated form of partial evaluation binding-time analysis (BTA), including program-point-specific polyvariant division and specialization, and dynamic versions of traditional global and peephole optimizations. The system provides policies that govern the aggressiveness of specialization and caching. It allows these policies to be declaratively specified, enabling programmers to gain fine control over the dynamic compilation process. It also enables programmers to specialize programs across arbitrary edges, both at procedure boundaries and within procedures, and to specialize programs based on evaluation of arbitrary compile-time and run-time conditions.

According to a first aspect of the invention, a method is provided for specializing a computer program by using a set of annotated policies. The computer program to be specialized comprises source code that is processed to generate machine-executable instructions comprising statically compiled code portions and specialized code portions. The specialized code portions comprise dynamically-compiled instructions that are generated at run time so as to operate on variables and data structures, which are constant at run time and are thus called run-time constants. The policies define directions for generating the specialized code portions and for integrating the specialized code portions with the statically-compiled code portions. Each policy is associated with a program statement and a value. The program statements are used by a programmer to annotate the original source code of a program, enabling the programmer to assert fine control over the program's specialization. The annotated program statements are placed in the source code at points where specialization is cost effective—that is, the increase in performance provided by the specialization more than offsets the extra run-time overhead required to perform the specialization. Preferably, the policies are bound to their associated variables by generating a control flow graph (CFG) representation of the program's procedures and performing an iterative data flow analysis over the CFG for each procedure to propagate a set of divisions that map the variables to the policy values defined by the statements in the annotated source code. The source code is then processed to generate the statically-compiled code portions and to create run-time specializers that dynamically compile the specialized code portions when the code portions are requested to be executed at run time, based on the bound policy values.

According to a second aspect of the invention, a method is provided for conditionally specializing a computer program. The method enables programmers to annotate source code with conditional statements based on arbitrary compile-time and run-time conditions. The conditional statements are evaluated at compile time and/or at run time to determine which portions of a program are to be specialized. The specialized code portions preferably comprise a run-time specializer with a prepended specializer stub used to control the execution of the specialized code portion at run time.

According to another aspect of the invention, a method is provided for positioning cache lookups within a specialized computer program. The cache lookups are used to identify portions of a computer program that have already been specialized and are placed at locations within the program suitable for specialization. This method first identifies ranges within the dynamically-compiled portions of the program where the potential for code reuse might arise, wherein each range corresponds to a run-time constant and spans program points over which the run-time constant is operated on by the specialized code. These ranges are then coalesced by forming intersections between ranges that span common program points, preferably on a procedure-by-procedure basis. The cache lookups are then placed within the coalesced ranges, thereby reducing the number of cache lookup for a given program.

According to another aspect of the invention, a method is provided for enabling on-demand specialization across arbitrary control flow edges. Given a CFG representation of a computer program, and a particular edge in the CFG that connects two basic blocks, the method provides a mechanism for specializing the source block of the edge, while deferring the specialization of a destination block until the specialized version of the source block and the edge are executed, thereby creating a method for lazy (i.e., on-demand) specialization. The edge connecting the source block to the destination block is replaced with code that generates a stub, which is executed immediately after execution of the source block. The stub gathers values of the variables that are used in determining the specialization of the destination block, and invokes a specializer routine to create a specialized version of the destination block with respect to the gathered variable values.

According to another aspect of the invention, a system is provided for implementing the methods discussed above. The system includes a memory in which a plurality of machine instructions comprising a compiler are stored, and the memory is coupled to a processor that executes the machine instructions to perform the steps of the foregoing methods. The machine instructions preferably instruct the processor to create run-time specializers by generating extensions that dynamically compile the specialized code portions when the code portions are requested to be executed at run time, based on the annotated policies and/or conditional statements in a program's source code. The generating extensions allow the program to be distributed as a stand-alone application.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 6:
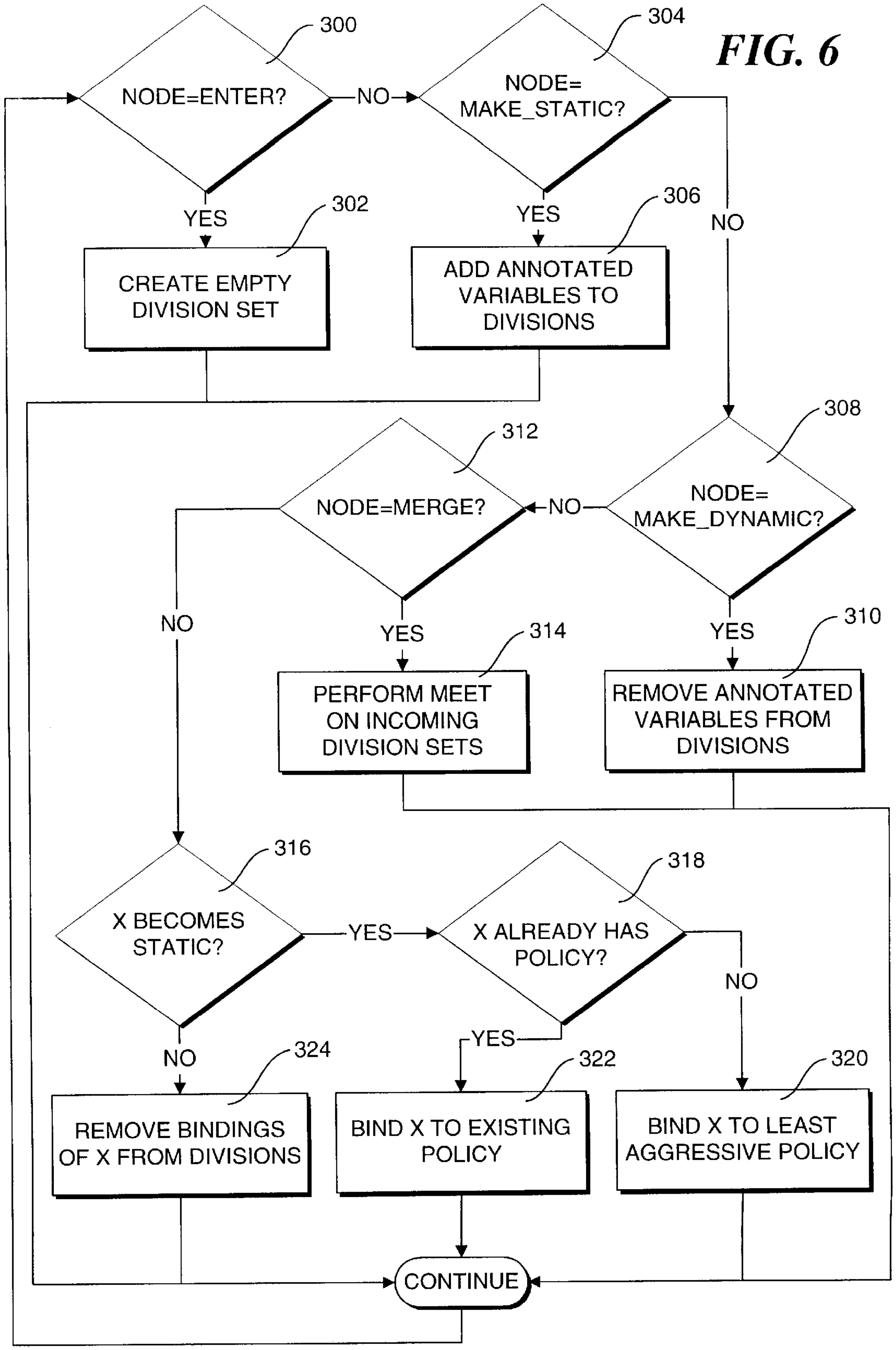
Figure 12:
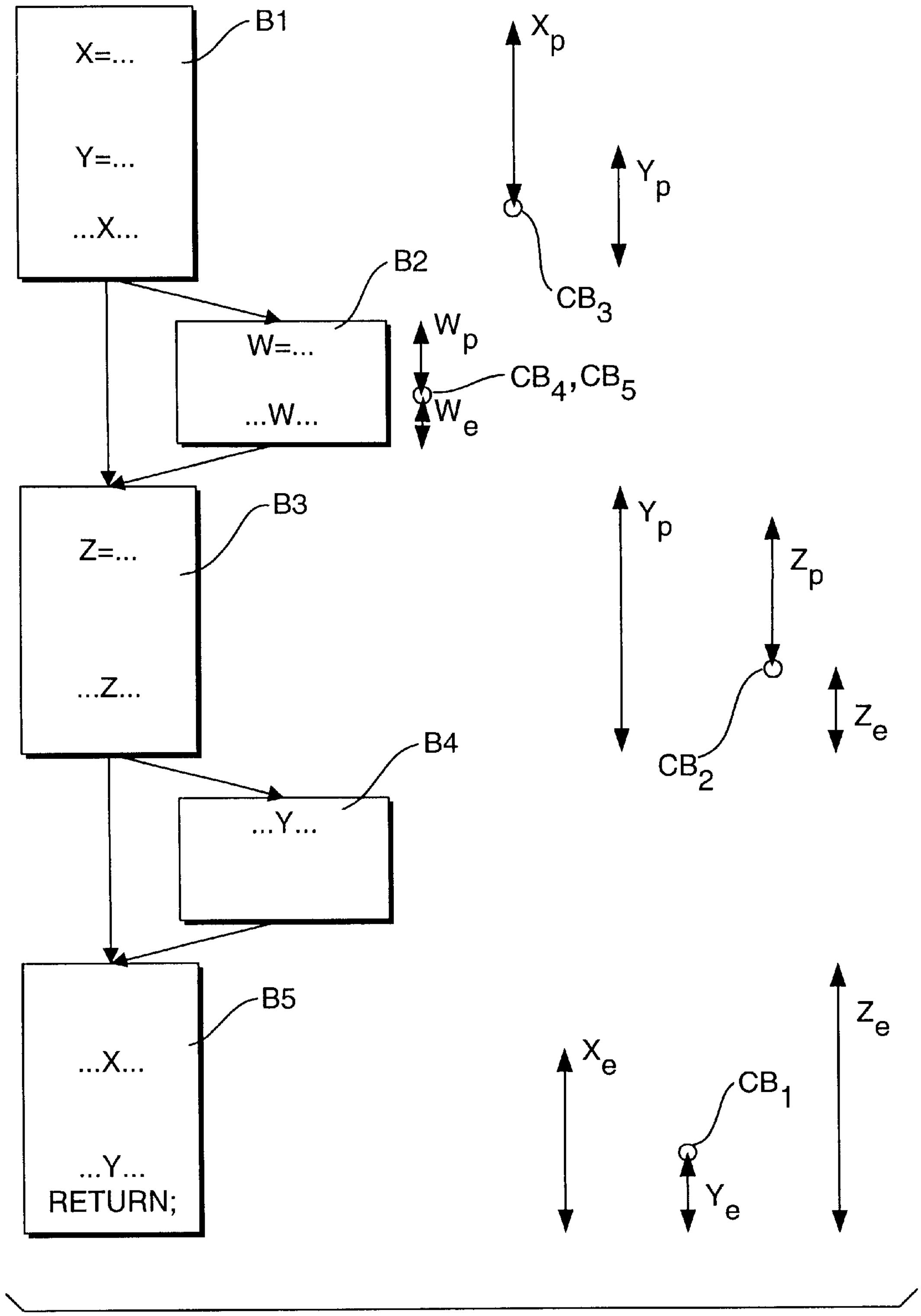
Figures 13A, 13B, 13C:
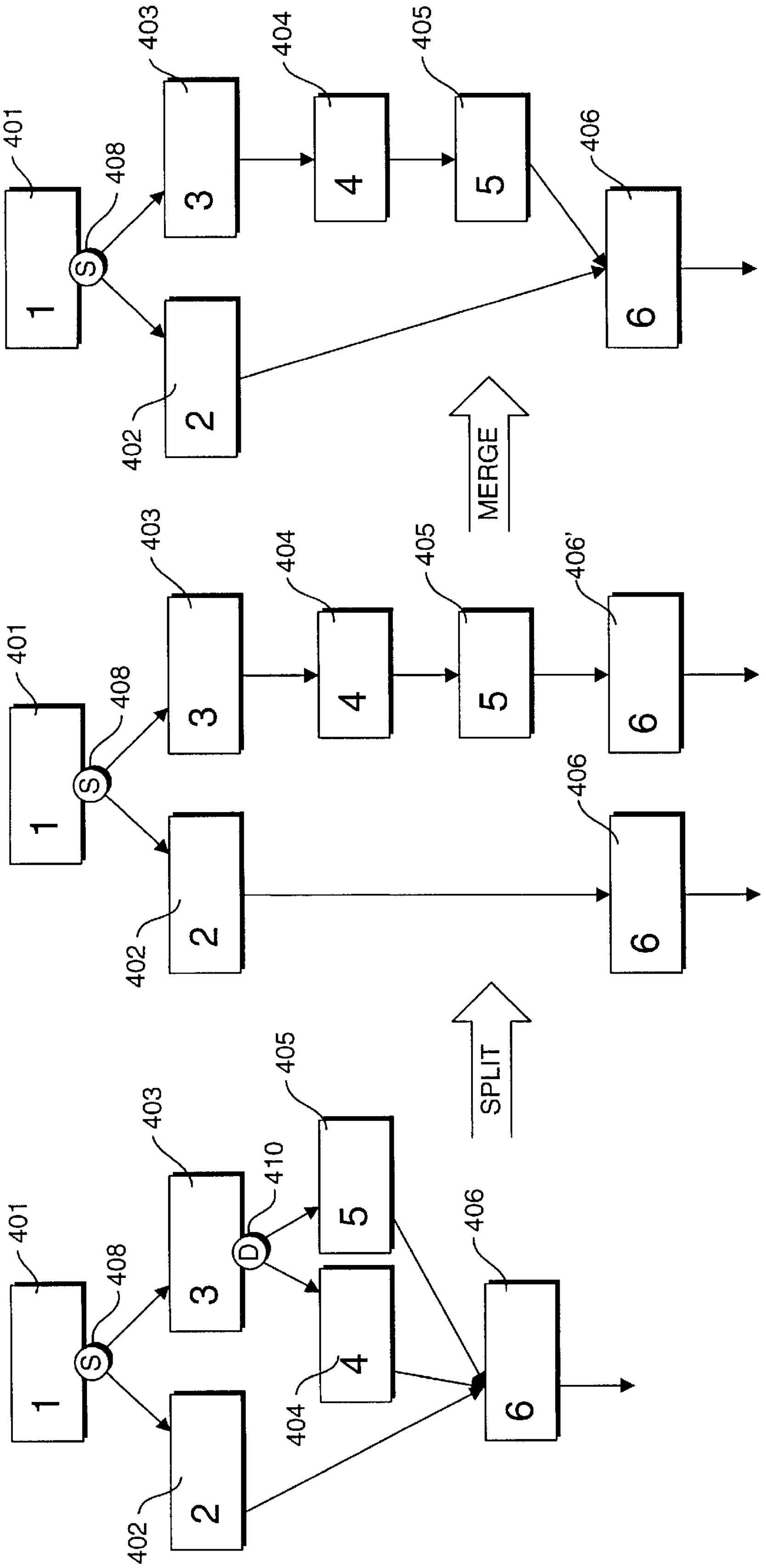
Figures 14, 15:
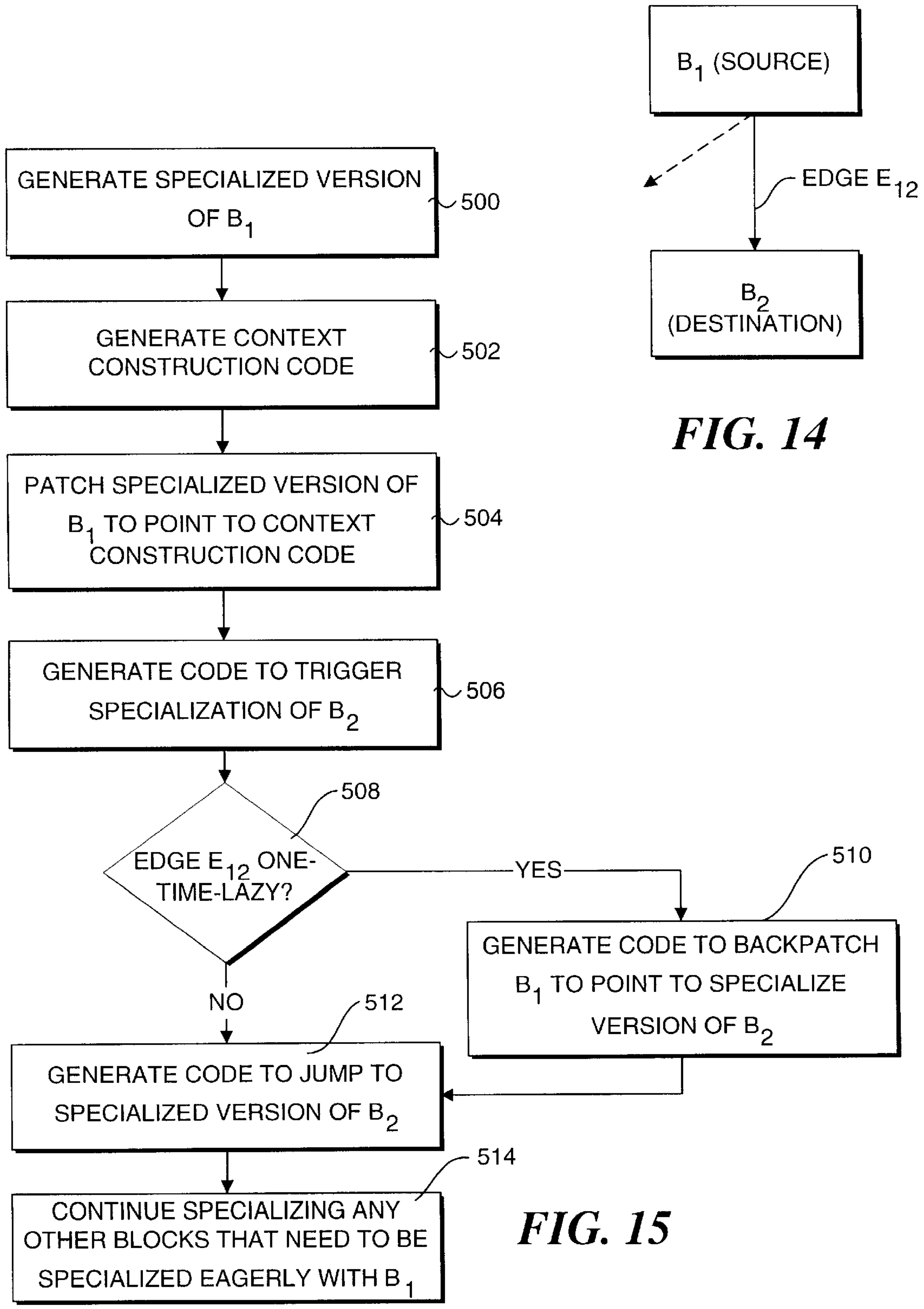
Figure 16:
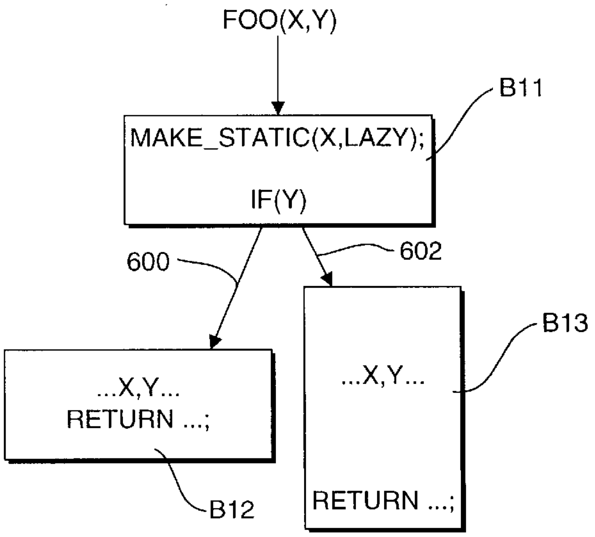
Figure 17:
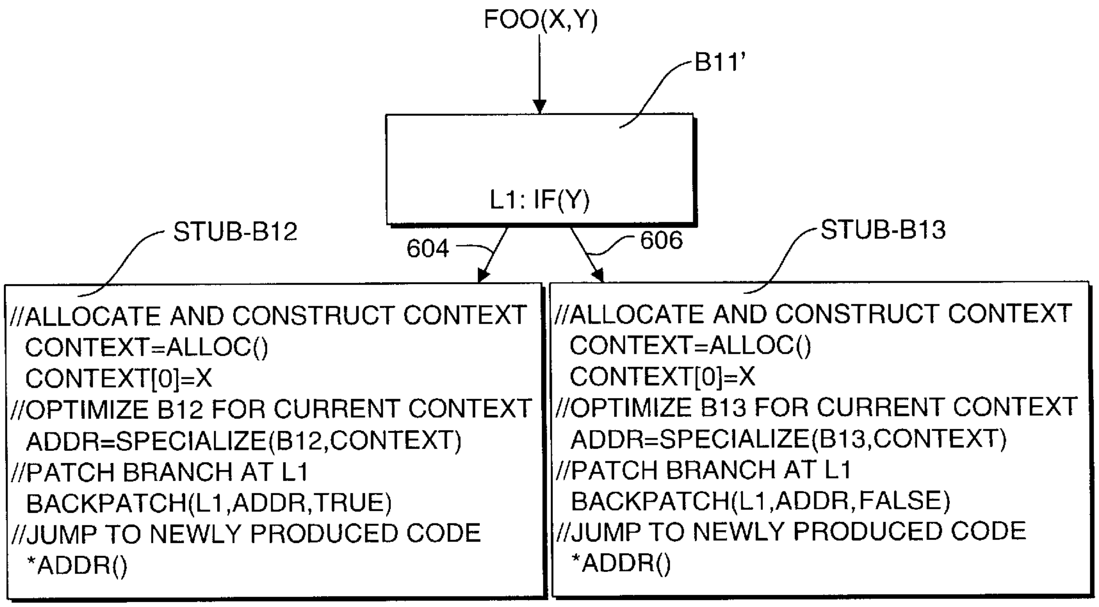
Figure 18:
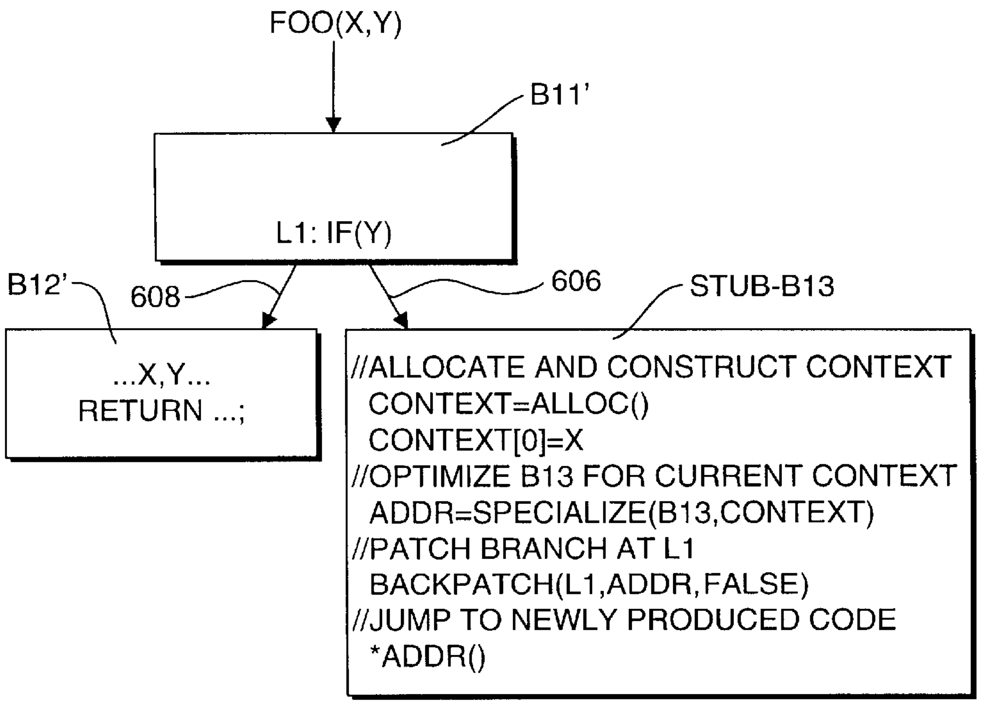
Figure 19:
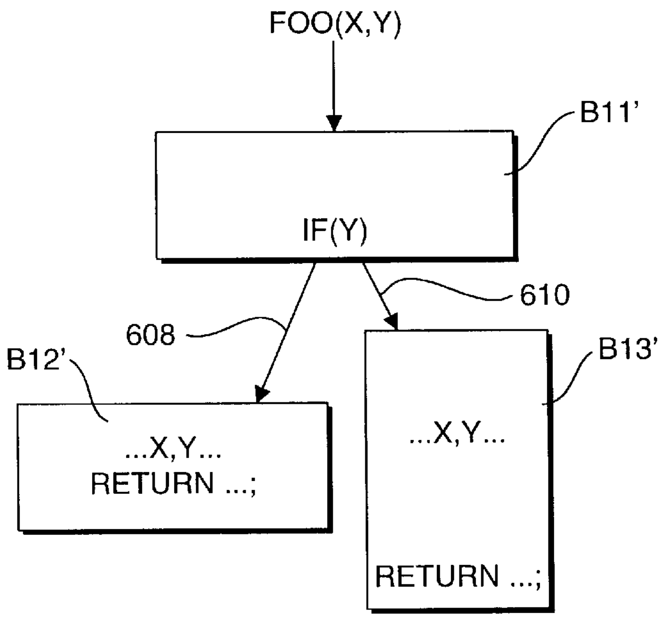
Figure 20A:
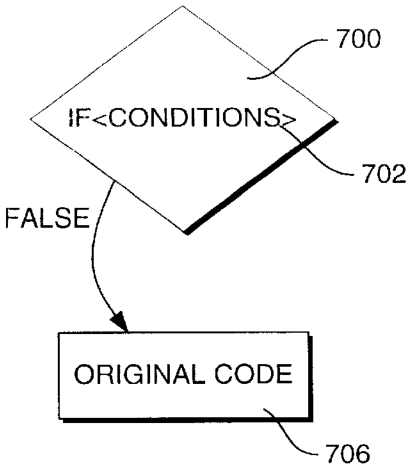
Figure 20B:
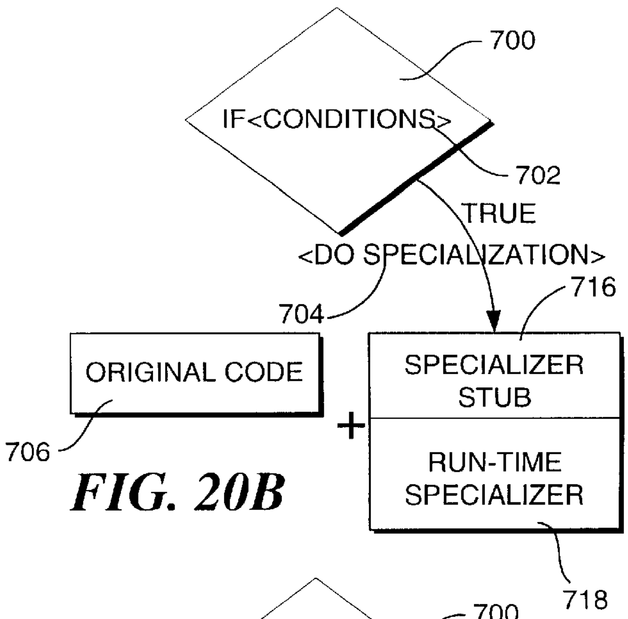
Figure 21A:
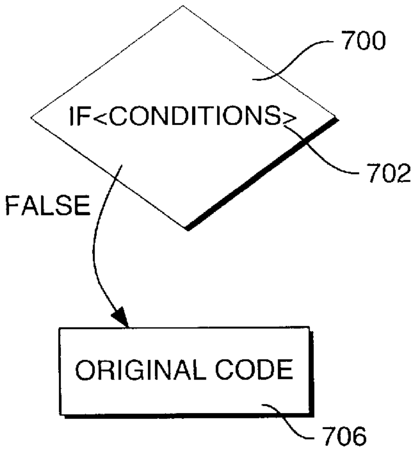
Figure 21B:
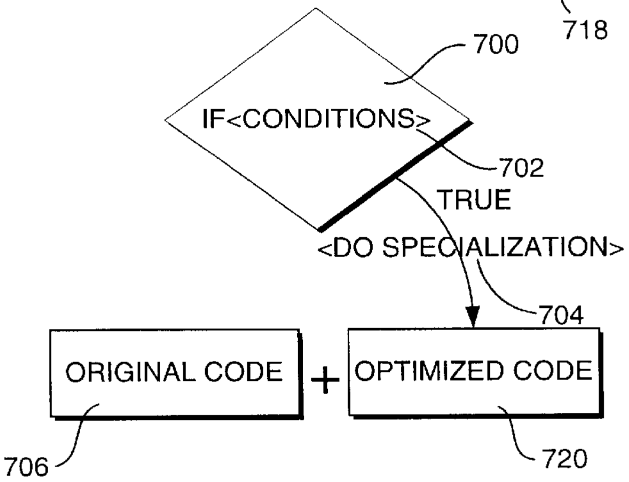
Figure 22:
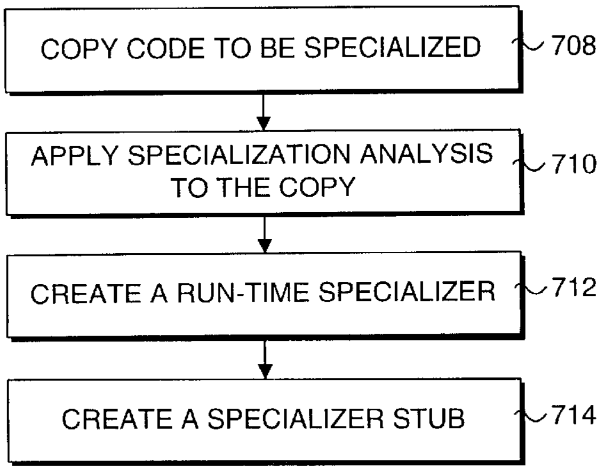
Figure 25:
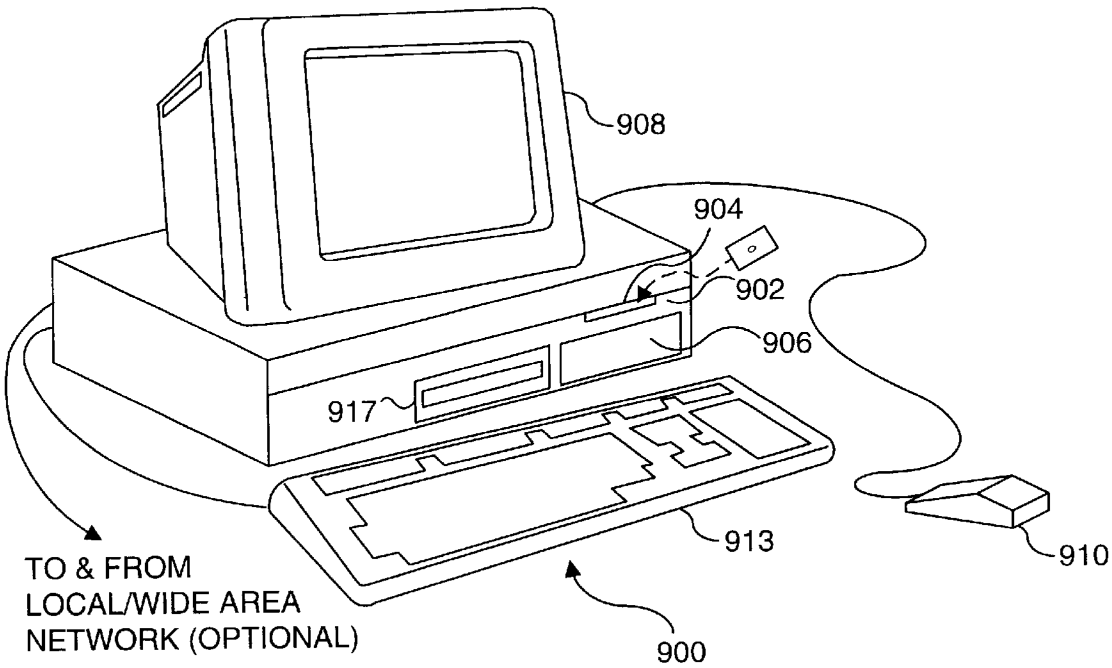

FIGS. 3, 4, and 5 list exemplary code segments for implementing a run-time specializer according to the present invention;

FIG. 6 is a flow chart illustrating the logic the dynamic-compilation system uses in determining how sets of divisions are caused to flow across nodes in a CFG;

FIG. 7 is an exemplary listing illustrating the domain of a BTA implemented by the dynamic-compilation system;

FIG. 8 is an exemplary listing of some of the constraints on a form of the domain specified in FIG. 7, in accord with the dynamic-compilation system;

FIG. 9 lists the grammar for the program representation used in a preferred embodiment of the present invention in analyzing CFGs;

FIGS. 10A–10C list the various flow functions used in the BTA implemented by the dynamic-compilation system;

FIGS. 11A–11B list helper functions that are used by the dynamic-compilation system in performing the BTA;

FIG. 12 is a code block diagram corresponding to an exemplary procedure, with associated ranges over which run time constants are valid, for illustrating clustering of unit boundaries as implemented by the dynamic-compilation system;

FIG. 13A is a block diagram that graphically portrays the relationship between code blocks corresponding to an exemplary procedure implemented prior to processing by a preferred embodiment of the present invention;

FIG. 13B is a block diagram showing the relationship between the code blocks of FIG. 13A after they have been split and linearized by the preferred embodiment of the present invention;

FIG. 13C is a block diagram showing the relationship between the code blocks of FIGS. 13A–B after they have been integrated by the dynamic-compilation system;

FIG. 14 is a block diagram of a portion (sub-graph) of a CFG showing a source block and a destination block connected by an edge;

FIG. 15 is a flow chart illustrating the logic the dynamic-compilation system uses to transform the sub-graph shown in FIG. 14 into a sub-graph that achieves suspended specialization across the edge;

FIG. 16 is a block diagram showing an exemplary function prior to specialization;

FIG. 17 is a block diagram illustrating the function of FIG. 16 after specializer stubs have been added;

FIG. 18 is a block diagram illustrating the function of FIG. 16 after the left-hand specializer stub is executed;

FIG. 19 is a block diagram showing the function of FIG. 16 after both stubs have been executed;

FIGS. 20A–20B is a chart illustrating the before and after effects of conditional specialization performed at run time by the dynamic-compilation system;

FIGS. 21A–21B is a chart showing the before and after effects of conditional specialization performed at compile-time by the dynamic-compilation system;

FIG. 22 is a flow chart showing the logic the dynamic-compilation system uses for implementing conditional specialization;

FIG. 23 is a table showing various applications and kernels that have been dynamically compiled and tested using the dynamic-compilation system;

FIG. 24 is a table showing the results of the testing listed in FIG. 23; and FIG. 25 shows an exemplary computer suitable for practicing the present invention.

DESCRIPTION OF THE PREFERRED EMBODIMENT

System Overview

The present invention provides a system and method for performing selective dynamic compilation using run-time information. A preferred embodiment of the invention, called "DyC," is a declarative, annotation based dynamic-compilation system, which allows programmers to declaratively specify policies that govern the aggressiveness of specialization and caching, enabling the programmers to assert fine control over the dynamic compilation process. DyC provides for portions of a program to be specialized, and the specialized portions are dynamically generated at run time, based on run-time information so as to enhance program performance. To trigger run-time compilation, the system enables programmers to annotate a program's source code to identify static variables (variables that have a single value, or relatively few values, during program execution—i.e., run-time constants) on which many calculations depend. DyC then automatically determines the parts of the program downstream of the annotations that can be optimized based on the static variables' values (called dynamically compiled regions or simply dynamic regions), and arranges for each dynamic region to be compiled at run time, once the values of the static variables are known. To minimize dynamic compilation overhead, DyC stages its dynamic optimizations, performing much of the analysis and planning for dynamic compilation and optimization during static compile time.

Figure 1:
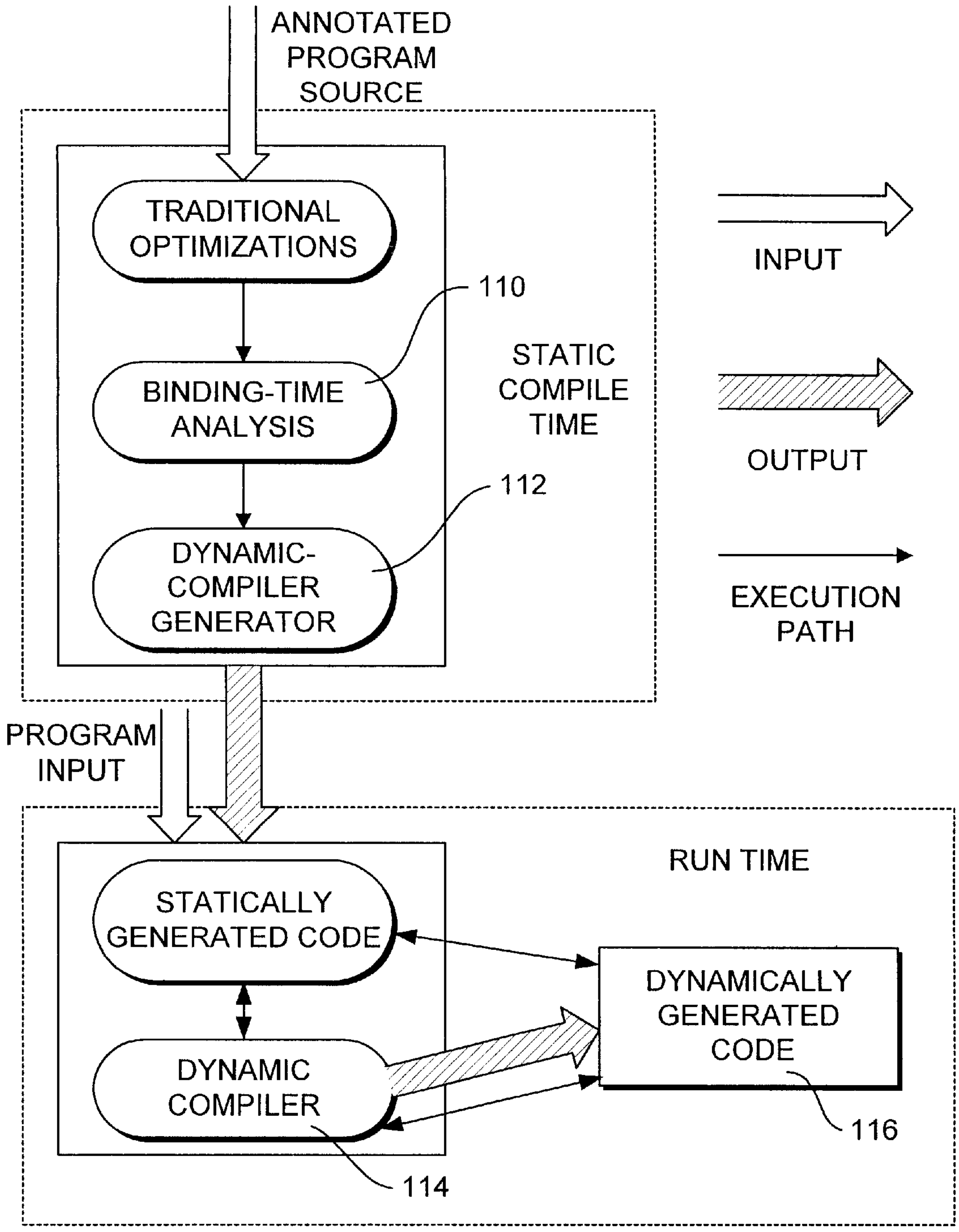
FIG. 1 is a block diagram showing the primary functional blocks used by a preferred embodiment of a dynamic-compilation system in accord with the present invention.

DyC extends a traditional (static) optimizing compiler with two major components, as shown in FIG. 1. As in off-line partial evaluation systems, a BTA 110 is performed to identify those variables (called derived static variables) whose values are computed solely from annotated or other derived static variables; the lifetime of these static variables determines the extent of the dynamic region. The BTA divides operations within a dynamic region into those that depend solely on static variables (and therefore can be executed only once) (the static computations), and those that depend in part on the remaining (non-static) variables (the dynamic computations). The static computations correspond to those computations that will be constant-folded at run time; the BTA is the static component of staged dynamic constant propagation and folding.

For each dynamic region, a dynamic-compiler generator 112 produces a specialized dynamic compiler 114 that will dynamically generate code 116 at run time for that region, given the values of the static variables on entry into the region.

In more detail, DyC performs the following steps when compiling each procedure at static compile time. First, DyC applies many traditional intra-procedural optimizations, stopping just prior to register allocation and scheduling. Then, for procedures that contain annotations, the BTA identifies derived static variables and the boundaries of dynamic regions. This analysis also determines the conditional branches and switches that test static variables and so can be folded at dynamic compile time. DyC also determines the loops that have static induction variables and can therefore be completely unrolled at dynamic compile time.

Each dynamic region is replaced with two control flow sub-graphs, one containing the static computations (called set-up code) and one containing the dynamic computations (called template code). Where a dynamic instruction in the template code refers to a static operand, a place-holder operand (called a hole) is used. The hole will be filled in at dynamic compile time, once its value is known.

Register allocation and code scheduling are then applied to the procedure's modified CFG. By separating the set-up and template sub-graphs, register allocation and scheduling can be applied to each separately, without one interfering with the other. By keeping these two sub-graphs in the context of the rest of the procedure's CFG, any variables that are live both inside and outside the dynamic region can be allocated registers seamlessly across dynamic region boundaries.

Finally, a custom dynamic compiler for each dynamic region (also called a generating extension) is built simply by inserting emit code sequences into the set-up code for each instruction in the template code; the template sub-graph is then discarded. This dynamic compiler is fast, in large part, because it neither consults an intermediate representation nor performs any general analysis when run. Instead, these functions are in effect "hard-wired" into the custom compiler for that region, represented by the set-up code and its embedded emit code.

At run time, a dynamic region's custom dynamic compiler is invoked to generate the region's code. The dynamic compiler first checks an internal cache of previously dynamically generated code for a version that was compiled for the values of the annotated variables. If one is found, it is reused. Otherwise, the dynamic compiler continues executing, evaluating the static computations and emitting machine code for the dynamic computations (and saving the newly generated machine code in the dynamic code cache when it is done compiling). Invoking the dynamic compiler and dispatching to dynamically generated code are the principal sources of run-time overhead.

DyC supports both polyvariant specialization and polyvariant division at arbitrary program points—not just function entries as other declarative dynamic-compilation systems do. Polyvariant division allows the same program point to be statically analyzed for different combinations of variables being treated as known. Polyvariant specialization allows multiple dynamically compiled versions of code to be produced using a single set of known variables, each specialized for different values of the known variables. Polyvariant specialization enables, for example, full loop unrolling when given the loop bounds; the body of the loop is specialized for each value of a loop induction variable. Because these powerful transformations have a significant cost, DyC provides control over the aggressiveness of specialization through declarative policies, allowing the user to selectively apply code-duplicating (i.e., specializing) transformations. The aggressiveness of specialization relates to the extent to which code is duplicated in order to create specialized versions of code. For example, more aggressive policies specify more duplication of code (corresponding to more specialized versions).

Figure 2:
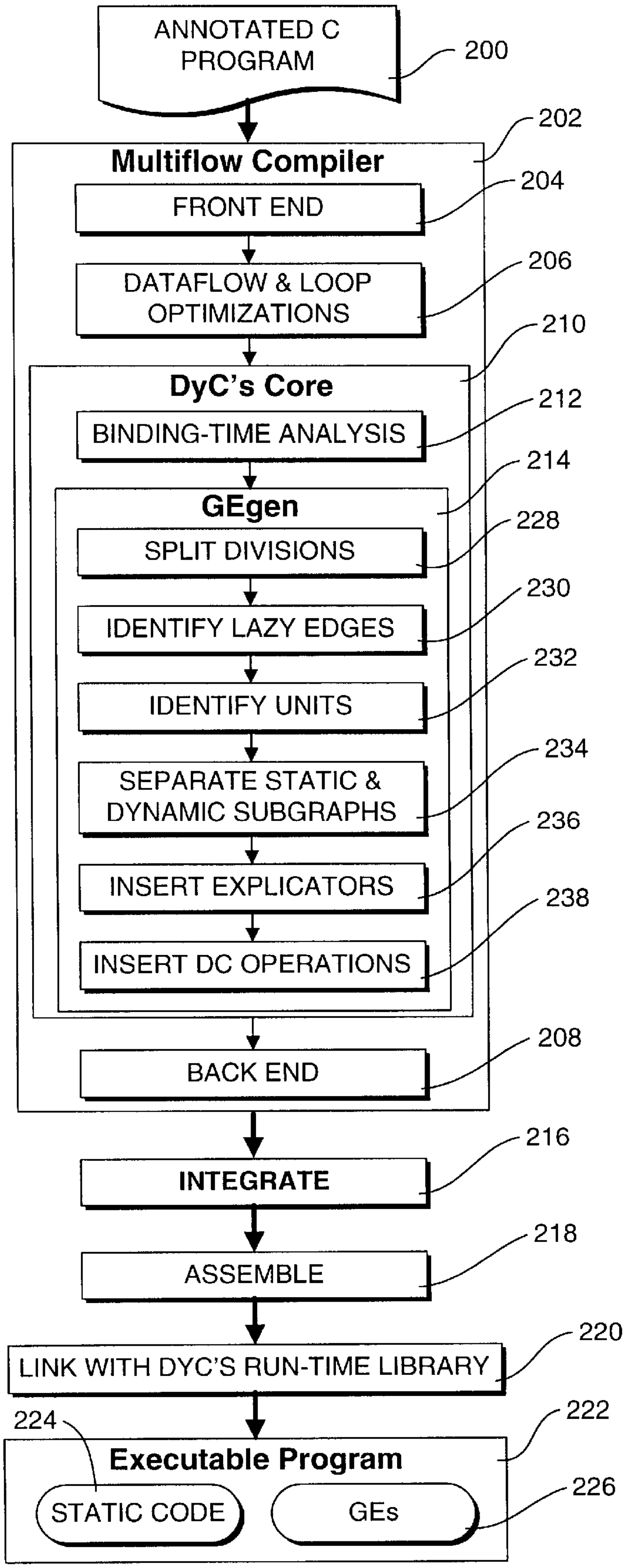
FIG. 2 is a block diagram showing the primary functional components of the dynamic-compilation system of FIG. 1.

The primary functional components of the system are shown in FIG. 2. The system begins with an annotated C program 200, which is compiled by the Multiflow compiler 202. The Multiflow compiler is a variation of a Multiflow trace scheduling compiler, a description of which is presented in the Journal of Supercomputing, May 1993. The Multiflow compiler comprises a front end 204, a data flow and loop optimization block 206, and a back end 208. Also included is a core 210, which performs a BTA in a block 212, and includes a generating extension section 214. The system further performs an integration function in a block 216, an assembly function in a block 218, and a linking function in a block 220. The output of the system is an executable program 222 that comprises static code 224 and generating extensions 226.

The annotated C program is first operated on by data flow and loop optimization block 206, which generally performs analyses and transformations following traditional data flow optimizations, such as common subexpression elimination, and loop unrolling. It should be noted that some traditional optimizations must be modified so that they do not interfere with further analysis by the present invention, as explained in greater detail below.

Run-Time Specializer

The system uses a run-time specializer that enables code to be dynamically generated at run time based on run-time values of variables. Exemplary code segments for implementing a run-time specializer are shown in FIGS. 3–5. The run-time specializer is an adaptation of the strategy for polyvariant program-point specialization of a flow chart language described by N. D. Jones, C. K. Gomard, and P. Sestoft, in Partial Evaluation and Automatic Program Generation, Prentice Hall, 1993. The main process produces specialized code for a unit (a generalization of a basic block that has a single entry, but possibly multiple exits), given its context (the run-time values of the static variables on entry to the unit). The static compiler is responsible for breaking up dynamically compiled regions of the input program into units of specialization, producing the static data structures and code that describe units and their connectivity, and generating the initial calls to the Specialize function at the entries to the dynamically compiled code.

The Specialize function first consults a cache to see if code for the unit and an entry context has already been produced (using the unit's caching policy to customize the cache lookup process), and if so, reuses the existing specialization. If not, the unit's ReduceAndResidualize function is invoked to produce code for the unit that is specialized to the input context. The updated values of the contexts at program points that correspond to unit exits are returned. The specialized code is added to the cache (again customized by the unit's caching policy). Further details of the caching policy are discussed below.

Finally, the specializer determines how to process each of the exits of a specialized unit. Each exit edge can either be eager, in which case the successor unit is specialized immediately, or lazy, indicating that specialization should be suspended until run-time execution reaches that edge; lazy edges are implemented by generating stub code that will call back into the specializer when the edge is executed. Points of dynamic-to-static promotion always correspond to lazy edges between units; here, code is generated that will inject the promoted run-time values into the context before invoking the specializer.

To implement demand-driven specialization, DyC makes lazy the branch successor edges that determine execution of the code which is to be specialized on demand (identification of these edges is described below). DyC dynamically overwrites calls to the Specialize function placed on these edges with direct jumps to the dynamically generated code for the target units, which achieves a one-time suspension and resumption of specialization at each such point. This step requires that the edge bear no change in cache context and no dynamic-to-static promotions.

The caching structure for units is one of the chief points of flexibility in DyC. Each of the variables in the context has an associated policy (CacheAllUnchecked, CacheAll, CacheOne, and CacheOneUnchecked, which are in decreasing order of specialization aggressiveness) derived from user annotations (discussed below) and static analysis. CacheAllUnchecked variables are considered to be rapidly changing, and their values unlikely to recur, so that there is no benefit in checking and maintaining a cache of specializations to enable code sharing or reuse; each time the unit is specialized, a new version of code is produced, used, and either connected directly to the preceding code or, in the case of dynamic-to-static promotions, thrown away. For CacheAll variables, the system caches one version for each combination of their values for potential future reuse, assuming that previous combinations are likely to recur. For CacheOne variables, only one specialized version is maintained, for the current values of those variables. If the values of any of the variables change, the previously specialized code is dropped from the cache, assuming that that combination of values is not likely to recur. The values of CacheOneUnchecked variables are invariants or are pure functions of other non-CacheOneUnchecked variables, so the redundant cache checks for those variables are suppressed.

The run-time caching system supports mixes of these cache policies. If any variable in the context is CacheAllUnchecked, the system skips cache lookups and stores. Otherwise, it performs a lookup in an unbounded-sized cache based on the CacheAll variables (if any); if this lookup is successful, it is followed by a lookup in the returned single-entry cache based on the CacheOne variables, which, if successful, returns the address for the appropriate specialized code. CacheOneUnchecked variables are ignored during cache lookup. If all variables have the CacheOneUnchecked policy, then a single version of the code is cached with no cache key.

Since invoking the specializer is a source of overhead for run-time specialization, DyC performs a number of optimizations of this general structure, principally by producing a generating extension, which is essentially a specialized version of the Specialize function, for each unit. These optimizations are described below in more detail.

Annotated Policies for Controlling Run-Time Specialization

DyC enables a programmer to specify fine-grained control of run-time specialization through a set of policies. These policies enable programmers to have control over multiple aspects of run-time specialization, including when the compiler should produce specialized code, and how many specialized versions to produce and cache for later reuse. The policies provide fine-grained (program-point-specific) control over tradeoffs in the specialization process, which is important for good performance. Specialization control is provided through a set of annotations, whereby a programmer can specify particular policies, and a process for propagating the policies within compiler data structures, so that run-time specializers, which apply the policies, are constructed automatically. The propagation process is a BTA that uses the specified policies to select between specialization alternatives when computing static variables. In addition, safe defaults are provided for all policies, in case the programmer chooses not to specify a policy.

There are three types of program points where policy information is useful: (1) dynamic-to-static promotion points; (2) control flow merges; and (3) dynamic branches. At program points where new specialized versions of code can be initiated, policies are provided to restrict the creation of multiple versions to prevent over specialization. Other policies are provided for controlling how the code generated at these points is cached. In addition, DyC provides policies for use at branches to control speculative specialization, i.e., to determine whether code on both paths from the branch should be specialized before it is known which path will be executed.

The different types of program points and the specific policies that are parameterized by the system are described in greater detail as follows:

1. Dynamic-to-static Promotion Points

Program variables are normally dynamic, i.e., their values can be freely defined and used at run time. Dynamic variables can be used to specialize a program by deferring specialization until such variables have been defined. By doing so, the variables become static, and their values are essentially fixed in the specialized code. This point is defined as a dynamic-to-static promotion point.

There are two sets of policies that apply at promotion points, including Promotion Policies (as shown in TABLE 1), and Promotion Caching Policies (as shown in TABLE 2). The default policies are shown in bold.

TABLE 1

Dynamic-to-Static Promotion Specialization Policy Values
Promotion Policies

| Policy Value | Description |
|---|---|
| Auto_promote | Automatically insert a dynamic-to-static promotion when the annotated static variable is possibly assigned a dynamic value. |
| Manual_promote | Introduce promotions only at explicit annotations. |

TABLE 2

Dynamic-to-Static Promotion Caching Policy Values
Promotion Caching Policies

| Policy Value | Description |
|---|---|
| p_cache_none_unchecked | Specialize at promotion points, assuming that the promoted value is different than any previous or subsequent specialization. |
| p_cache_all | Cache all specialized versions of promotion points. |
| p_cache_one | Cache only the latest version at promotion points. |
| p_cache_one_unchecked | Cache one version, and assume the promoted value is the same for all future executions of this promotion. |

Note that the caching policies provide control over both the number of cached versions of specialized code that are maintained (i.e., none, one, or all previously specialized versions may be cached), and over whether to dispatch on the promoted value when choosing the cached version.

2. Control Flow Merges

A control flow merge is a point where multiple program paths join. Policies that apply at merge points are shown below in TABLES 3–5.

TABLE 3

Merge Division Policy Values
Division Policies

| Policy Value | Description |
|---|---|
| Poly_divide | Perform polyvariant division. |
| Mono_divide | Perform monovariant division. |

Monovariant division permits variables to be divided between static and dynamic in only one combination at a program point. Polyvariant division allows different combinations of variables to be treated as static at one program point. Multiple divisions arise after a merge when incoming paths into the merge are annotated differently.

TABLE 4

Merge Specialization Policy Values
Specialization Policy

| Policy Value | Description |
|---|---|
| Poly_specialize | Perform polyvariant specialization at merges. |
| Mono_specialize | Perform monovariant specialization at merges. |

Monovariant specialization permits only one version of code to be generated for the merge for each version preceding it. Polyvariant specialization produces a version for each path, if there are different values of static variables on different paths. The effect can be powerful, causing multiway loop unrolling. However, unfolding all possible paths through loops with dynamic branches can lead to code explosion.

TABLE 5

Merge Caching Policy Values
Merge Caching Policy

| Policy Value | Description |
|---|---|
| m_cache_all_unchecked | Specialize at merges, assuming that the context is different than any previous or subsequent specialization. |
| m_cache_all | Cache each specialized version at merges. |
| m_cache_one | Cache only the latest version at merges, throwing away the previous version if the context changes. |
| m_cache_one_unchecked | Cache one version, and assume the context is the same for all future executions of this merge. |

Merge caching policies at merge points are analogous to the caching policies at promotion points.

3. Dynamic Branches

A dynamic branch is one whose direction is determined by a dynamic predicate. Dynamic branches determine execution of dynamically generated code. When the branch is specialized, it is not known whether both successors will be executed. The run-time specializer may decide (according to the current laziness policy) whether to speculatively specialize both successors, or whether to suspend specialization and allow the successors to be specialized on demand. TABLE 6 lists different policy values that correspond to the laziness policy.

TABLE 6

Speculative-Specialization (Laziness) Policy Values
Laziness Policies

| Policy Values | Description |
|---|---|
| Lazy | Suspend specialization at all dynamic branches, avoiding all speculative code generation. |
| Specialize lazy | Suspend specialization at all dynamic branch successors dominating specializable merge points and specializable call sites, avoiding speculative specialization of multiple versions of code after merges. |
| Loop_specialize_lazy | Suspend specialization at all dynamic branch successors dominating specializable loop-head merge points and specializable call sites, allowing speculative specialization except where it might be unbounded. |
| Eager | Eagerly specialize successors of branches, assuming that no unbounded specialization will result, allowing full speculative specialization. |

Policy Implementation

DyC employs two main components to enable annotation of policies. The first component is an interface for associating a policy with a variable at a given program point. The interface is implemented by annotating a program's source code. The basic annotations that drive run-time specialization are make_static, and make_dynamic. Make_static takes a list of variables, each of which is treated as a run-time constant at all subsequent program points until DyC reaches either a make_dynamic annotation that lists the variable or the end of the variable's scope (which acts as an implicit make_dynamic).

Source code can be annotated with make_static, using the following syntax, which associates the variable identified as variable-name with the policy value policy-value.

make_static (variable-name:policy-value)

A policy value is simply one of the different values corresponding to a policy.

A make_dynamic annotation may be used to clear all policies associated with a variable at a given program point, using the following syntax.

make_dynamic (variable-name)

The second component comprises a system for propagating bindings from variables to policy values through the program. The system uses an iterative data flow analysis (IDFA) on a CFG to propagate sets of divisions. A division is a mapping from variables to policy values. Since polyvariant division is supported, a given variable can have more than one policy value associated with it for each policy at a given program point, giving rise to multiple divisions at each program point.

FIG. 6 illustrates the logic used by the system in determining how sets of divisions are caused to flow across nodes in the CFG. In a decision block 300, a determination is made as to whether the node being processed is an entry node. If the answer is yes, the set of divisions is initialized to be empty in a block 302, and the processing of the current node is complete. If the node is not an entry node, the logic flows to a decision block 304, which determines if the node is of the form make_static (x:new_value). If the answer is yes, all pairs ((x, old_value), where old_value is a value of the same policy as new_value), are deleted from each division being caused to flow, and a pair of annotated variables (x, new_value) is added to each division in a block 306, whereupon the processing of the node is complete. If the answer to decision block 304 is no, the logic flows to a decision block 308, which determines if the node is a make_dynamic (x) node. If so, the annotated variables, e.g., all bindings of the form (x, *), are removed from each division in a block 310, and the processing of the node is complete.

If the node is not a make_dynamic (x) node, the logic flows to a decision block 312, wherein a determination is made as to whether the node being processed is a merge node. If so, a block 314 performs a meet operation on incoming data sets, whereby the set of divisions succeeding the node is set to the result of a meet of the two incoming sets of divisions at the node, and the process is complete. The meet of two sets of divisions is the union of the pair-wise meet of the divisions in the sets. When meeting a pair of divisions, if either division has variables undergoing polyvariant division, the meet results in one extra division being generated for each policy value of the variable at the meet. For the other variables in the divisions being met, the resultant division simply contains the meet of the policy values for each policy of those variables from each division. The policy values are assumed to fit in a lattice, with more aggressive policies lower in the lattice (see TABLE 7 below for the lattices corresponding to particular policies), and with the meet of two lattice points corresponding to the greatest lower bound of the points. The flow analysis initializes values to the highest point on the lattice and solves for the greatest fixed point.

The remaining possibility (where all determinations made in decision blocks 300, 304, 308, and 312 have resulted in "no" answers) is that the operation at the node is "normal" (i.e., of the form x:=. . . ), and in a decision block 316, a determination is made to whether or not the right-hand side of the foregoing equation consists of variables that are all static. If the answer is yes, x is a derived static variable, and the logic flows to a decision block 318. This decision block determines if the derived static variable already has a policy value attached to it. If no policy value is attached to it, in a block 320, the derived static variable is assigned the highest policy value (i.e., least aggressive policy) in the lattice of values for that policy. The basic intuition is that in the absence of instructions to the contrary, specialization for derived variables should be the least aggressive possible. If the derived variable had a policy associated with it in the incoming division (i.e., the answer to decision block 318 is yes), x is bound to that policy in a block 322. If on the other hand, the node makes x dynamic, the answer to decision block 316 is no, and the system removes bindings of x (x,*) from all divisions in a block 324.

The lattices for the policies the invention implements are shown below. Each of these lattices is a total order on the possible policy values. Picking the greatest lower bound of two policy values therefore corresponds simply to picking the lower of the values in the lattice.

TABLE 7

| | Lattices of Policy Values<br>Policy Lattice |
|---|---|
| Policy | Lattice of Policy Values |
| Specialization | poly_specialize <= mono_specialize |
| Division | poly_divide<=mono_divide |
| Promotion | auto_promote <= manual_promote |
| merge-caching | m_cache_all_unchecked <= m_cache_all <= m_cache_one <= m_cache_one_unchecked |
| promotion-caching | p_cache_none_unchecked <= p_cache_all <= p_cache_one <= p_cache_one_unchecked |
| Laziness | laz <= specialize_lazy <= loop_specialize_lazy <= eager |

The IDFA to propagate policy values from annotations to all relevant program points is completely defined by the foregoing policy lattice, the flow functions, and the meet functions.

In traditional implementations of specializers, a BTA exists to determine which variables are static, and which are dynamic. Decision block 316 of FIG. 6 requires information from the BTA to determine whether the variables are static or dynamic. In turn, some of the policy information (such as the specialization and promotion policies) influences the BTA's determination of which variables are static or dynamic. Due to this co-dependence between the BTA and the policy flowing analyses, the two necessarily run in lock-step. In fact, in a preferred implementation, the two flow analyses are folded into one IDFA.

It should be noted that the particular syntax presented above for associating variables with policy values (or for disassociating variables from policies) is one of many possible syntax's that could be used. Any syntax that sets up (or destroys) the association of variables with policies could be implemented. Additionally, the discussion above specifies assigning the least aggressive policy possible to derived static variables (when no policy has been previously assigned). As an option, the policy assigned to the derived state variable could be some (approximately defined) meet of the policies of the variables from which it is defined.

Though several policies are shown in the tables above, the framework for specifying and propagating policies in the preferred embodiment is not limited to these particular policies. Specifically, additional policies that have richer lattices than those presented above can be implemented following the same scheme. Furthermore, the policies can control any other aspect of specialization, as long as they are expressible as policy values, attributable at program points, and flow functions are definable to propagate these policy values from their annotation points.

Interprocedural Annotations

Run-time specialization normally applies within the body of a single procedure: calls to a procedure P from within a dynamic region or specialized function all branch to the same unspecialized version of P. P itself may have another specialized region in its body, but this break in the specialization will cause all the different specialized calls of P to merge together at the entry to P, only to be split back apart again by the cache checks at the make_static annotation in P's body. To avoid this overhead, calls can themselves be specialized, branching to correspondingly specialized versions of the callee procedure, thereby extending dynamic regions across procedure boundaries.

The specialize annotation names a procedure with a given number of arguments and provides a list of divisions for the procedure. Each division lists a non-empty subset of the formal parameters of the procedure that will be treated as run-time constants; a division can specify the same policies for listed variables as a make_static annotation. As described below, for each division, DyC's static compiler produces a code generation procedure (i.e., a generating extension) for that division that takes the static formals as arguments and, when invoked on their run-time values, produces a specialized residual procedure that takes the remaining arguments of the original procedure (if any), in classical partial evaluation style.

At each call site in a specialized region to a procedure P with an associated specialize annotation, DyC searches for the division specified for P that most closely matches the division of actual arguments at the call site (favoring divisions listed earlier in P's specialize annotation, in case of ties). The most closely matching division is the one with the greatest number of formal parameters annotated as static that correspond to static actual arguments and no static formals that correspond to dynamic actuals. If one is found, the static compiler produces code that, when specializing the call site at run time: (1) invokes the generating extension for the selected division of P, passing the necessary run-time constant arguments; and, (2) generates code that will invoke the resulting specialized version for P, passing any remaining arguments. Thus, when the specialized call is eventually executed, the call will branch directly to the specialized callee and pass only the run-time variable arguments. If no division specified for P matches the call, then the general unspecialized version of P is called. Calls to P outside any dynamic region continue to invoke the unspecialized version of P.

The callee procedure and any call sites can be compiled separately. They need to agree on the specialize annotation, which typically is placed next to the procedure's extern declaration in a header file. Since call boundaries across which specialization should take place are explicitly identified by the programmer, the inter-procedural analysis that would normally be required to identify (and propagate run-time constants through) specializable callees is avoided.

The constant prefix to the specialize annotation is an (unsafe) assertion by the programmer that the annotated procedure acts like a pure function; in other words, it returns the same result given the same arguments without looping forever, making externally observable side effects, or generating any exceptions or faults. DyC exploits this information by calling a constant function from call sites whose arguments are static at specialization time and treating its result as a run-time constant, i.e., reducing the call rather than specializing or residualizing the call. This behavior is different than simply providing a division where all formals are static, since that condition would leave a zero-argument call whose result was a dynamic value in the specialized code.

The system also allows the programmer to prefix individual function calls with an @ annotation to specify that the result of a function call should be treated as a run-time constant if its arguments are run-time constants. For instance, to indicate that a call to the cosine function is a pure function, a programmer could write:

make_static(x);
    y=cos@(x);
    .../* later uses of y are specialized for y's value
       at specialization time */...

The above example illustrates the use of "@" as a per-call site version of the constant annotation. This annotation is beneficial because the programmer may know that particular uses of a function will not generate side effects, although the function may produce side effects in general.

Analysis of the Annotations

Given the programmer annotations described in the previous section, DyC performs data flow analysis akin to BTA over each procedure's CFG representation to compute where and how run-time specialization should be performed. The output of this analysis is information associated with each program point (formally, each edge between instructions in the CFG); the domain of the information, BTA, is specified in FIG. 7. Some of the constraints on the form of the domain are specified in FIG. 8. Flow graph nodes are generated from the grammar shown in FIG. 9, where Var, Const, UnaryOp, BinaryOp, and Proc are terminals and Policies are as defined in FIG. 7. This output is used to produce the generating extension that invokes the run-time specializer, as described below.

In the accepted notation, $\rightarrow$ constructs the domain of partial finite maps (sets of ordered pairs) from one domain to another, dom and range project the first and second elements, respectively, of the ordered pairs in the map, and applying a map f to an element in dom(f) returns the corresponding range element. The notation uses x to construct cross-product domains. D(p) is written to project from the product p the element that corresponds to component domain D, and p[D$\rightarrow$v] is written to compute a new product p' that is like p but whose D element has a value v. Pow denotes the powerset domain constructor. Note that:

$$A \rightarrow B \subseteq \text{Pow}(A \times B).$$

The analysis essentially considers only scalar local variables and compiler temporaries, and annotated data structures are treated as static pointers. The binding times of memory locations are not computed.

The analysis computes a set of divisions for each program point. Each division maps variables annotated as static by make_static or specialize to their associated policies at that program point. Two divisions are distinct if and only if there is some variable in one division that is annotated with the polyvariant division policy and is either not found (i.e., it is dynamic) or is annotated differently in the other division; divisions that do not differ in the policies of any variables annotated with the polyvariant division policy will be merged together by the analysis.

For each division the analysis computes the following information:

(1) The analysis computes the set of static variables (run-time constants) at that program point, including both user-annotated static variables (called root variables) and any derived static variables computed (directly or indirectly) from them. The computed set of static variables will be used to determine which computations and operands are static, versus which are dynamic. In addition, it is used to index into the run-time specializer's caches; consequently, the analysis also computes the appropriate caching policy for each static variable. For internal purposes, the analysis tracks the set of annotated run-time constants from which each static variable was computed, directly or indirectly, as described in below.

(2) The analysis computes those points that require dynamic-to-static promotions of variables. Non-empty promotion sets correspond to promotion points for the listed variables. Promotions get inserted after make_static annotations for variables that are not already static, and after (potential) assignments of dynamic values to variables that are annotated with the auto-promotion policy.

(3) The analysis computes those points that require the demotion of variables. The set of demoted variables indicates which previously static variables have become dynamic and need to be initialized with their last static value by residual assignments (called explicators).

(4) The analysis identifies which merge points require polyvariant specialization, called specializable merges points, because at least one variable that is annotated with the polyvariant specialization policy has potentially different definitions on different merge predecessors. The set of such discordant variables is computed at these merge points, and is empty at all other points. The following paragraph describes the procedure representation that the system assumes and the set of data flow analyses used to construct this output.

Procedure Representation

The system assumes that the procedures being analyzed are represented in a standard CFG, where nodes in the graph can be of one of the following forms: (1) an operator node such as a move, add, or call, with one predecessor and successor; (2) a merge node with multiple predecessors and one successor; (3) a conditional branch node with one predecessor and multiple successors, with a single operand that selects the appropriate successor edge; (4) an entry node with no predecessors and a single successor, which acts to bind the procedure's formals upon entry; or, (5) a return node with one predecessor and no successors, and with a single operand that is the procedure's result.

To enable the analyses to detect when potentially different definitions of a variable merge, it is assumed that merge nodes are annotated with a list of variables that have different reaching definitions along different predecessors, yielding one variable in the list for each $\phi$-function that would be inserted if the procedure was converted to static single assignment (SSA) form.

Prepasses

The analyses will need to identify those program points where a variable may be assigned. Direct assignments as part of an OpNode are clear, but assignments through pointers and as side effects of calls are more difficult to track. The system abstracts this "may-side-effect" analysis problem into a prepass whose output is MayDefVars. MayDefVars is a set of variables at each program point that may be modified during execution of the previous node (other than the left-hand side variable of the node).

The analyses will work better if it can identify when annotated and derived run-time constant variables are no longer used (i.e., "dead"). The system abstracts the result of a live variables analysis into a prepass that computes LiveVars, the set of live variables at each program point. It also computes and abstracts a similar analysis, UsedVars, which is the set of variables at each program point that has an earlier definition and a later use (but may temporarily be dead at this point). LiveVars is used to determine when variables can be removed from StaticVarInfo. Because Division contains the policies attributed to annotated variables, a variable cannot be removed from Division when it simply goes dead; when the variable is used again downstream, its policy information will be needed. Hence, UsedVars is used to determine when an annotated variable can be removed from Division. Finally, the system processes the interprocedural specialization directives and records them in the Specializations domain. Specializations maps each annotated procedure to a set of divisions given in the specialize annotation and indicates whether the procedure was annotated as constant. This information is assumed to be replicated at all program points, for convenience in writing the analysis functions.

The Main Analysis

FIGS. 10A–C define flow functions of the annotation analysis. FIGS. 11A–B define helper functions of the annotation analysis. The BTA family of data flow equations defines the information on the program point(s) after a node in terms of the information computed for the point(s) before the node (bta), the helper information described below for the program point(s) after the node (lvs, uvs, and mds), and the ever-present specialized function information (sp). A solution to the (recursive) data flow equations is the greatest fixed point of the set of equations for each node in the procedure, which is solved by a simple iterative data flow analysis. The top element of the lattice, used to initialize back edges during the initial iteration of analysis of loops, is the empty set (no divisions). The system follows the conventions of data flow analysis in solving for greatest fixed points and initializing information along edges to the top of the lattice.

In general, each flow function computes a new, updated set of divisions from the inflowing set(s) of divisions. Any permanently dead variables (those no longer in the UsedVars set) are removed from the set of annotated variables, Division, and any, at least temporarily, dead variables (those no longer in the LiveVars set) are removed from the set of run-time constants, StaticVarInfo, to avoid unnecessary polyvariant division or specialization. Permanently dead variables are not removed from Division if any static variables derived from them are still live, because doing so would require those derived static variables to be killed, as described below.

Once a new set of divisions and associated information is computed, divisions that no longer differ in the policies of any variables annotated as leading to polyvariant division are merged together into a single division. Thus the degree of polyvariant division can vary from program point to program point.

Entry Nodes

The analysis of the procedure entry node creates the initial division(s), including at least the empty unspecialized division with no run-time constants. For a specialized procedure, each of the divisions listed in the specialize annotation introduces an additional specialized division in the analysis. For each division, the set of run-time constants is initialized to the set of annotated variables, with each variable's initial caching policy taken from its specified PromotionCachingPolicy.

Make Static and Make Dynamic Nodes

The analysis of a make_static pseudo-instruction adds a new static variable to each of the existing divisions and replaces the policies associated with the variable, if it is already present in some division. If the variable was not already a run-time constant in some division, then the make_static instruction introduces a dynamic-to-static promotion. The make_dynamic instruction simply removes the annotated variable from each of the inflowing divisions; as described above, this step may cause divisions to merge and run-time static variables derived from the newly dynamic variable to be dropped.

Assignment and Store Nodes

The various forms of assignment nodes all have similar analyses, dependent only on whether the right-hand side expression is a run-time constant expression. Compile-time constants are trivially run-time constants. A unary or binary expression yields a run-time constant, if its operands are run-time constants and if the operator is a pure function (e.g., it cannot trap and always returns the same result given the same arguments). A load instruction yields a run-time constant if and only if its address operand is a run-time constant (which includes fixed values, such as the address of a global or local variable) and it is annotated with @ by the programmer. A call to a procedure annotated by the programmer as constant yields a run-time constant if all its arguments are run-time constants. A store instruction has no definitely assigned result variable, only potential side effects, as described by the MayDefVars set. The effect of these nodes is summarized into two sets. The first is a (singleton or empty) set of variables definitely assigned run-time constant values; the other is a set of variables possibly assigned dynamic expressions (comprised of the assigned variable if the right-hand side expression is dynamic, as well as any variables in the MayDefVars set). The definitely static variables are added to the set of run-time constant variables. The possibly dynamic variables are divided into those annotated with the auto-promote policy (which instructs DyC to insert a dynamic-to-static promotion automatically if these variables are ever assigned a dynamic value), and those that aren't auto-promoted (which DyC drops from the set of annotated variables and the set of run-time constants, if present in either). As with the analysis of any node, dropping variables from the set of annotated variables can cause divisions to merge.

Merge Nodes

The analysis of a merge node must deal with discordant variables that have potentially different definitions along different predecessors (these variables were identified by a prepass and stored with the merge node, as described above). For those discordant variables that the programmer annotated as run-time constants with a polyvariant specialization policy, the analysis will mark this merge as discordant in those variables, triggering specialization of the merge and downstream code. Any other discordant variables are dropped from the set of annotated variables and run-time constants, if present. (Again, this dropping of variables from the annotated set may cause divisions to merge.)

Derived run-time constants are implicitly monovariantly specialized, since they were not explicitly annotated as polyvariantly specialized by the programmer. The caching policy for all discordant variables at the merge is set to those variables' merge caching policy.

This analysis can be improved for the case of a static merge. A static merge is a merge where at most one of the merge's predecessors can be followed at specialization time, because the predecessors are reached only on mutually exclusive static conditions. Since only one predecessor will be specialized, the merge node won't actually merge any branches in the specialized code and only one definition of each static variable will reach the merge when the residual code is executed. In fact, all that is required is to ensure that only one definition of a static variable can reach the merge at execution time, either because there is only one reaching definition, or potentially different definitions are only along predecessors with mutually exclusive static reachability conditions. Such variables are not included in the set of discordant variables. The reachability analysis used to identify static merges is discussed below.

Branch and Return Nodes

The analysis of a branch node simply replicates its incoming information along both successors (as always, after filtering the set of variables to exclude those that are no longer live along that successor). Return nodes need no analysis function, since there are no program points after return nodes.

Caching Policies and Derivations of Static Variables

At each program point, the analysis computes a caching policy for each variable. This caching policy is used to control indexing into the run-time specializer's caches of previously specialized code. Annotated variables at promotion points (and at the start of analysis of a division of a specialized function) are given the user-specified PromotionCachingPolicy value. At specializable merge points, a discordant variable is changed to use the variable's MergeCachingPolicy value.

Derived run-time constants are given the CacheOneUnchecked policy. This policy ensures that unannotated run-time constants are never used in cache lookups and consequently do not lead to additional specialization beyond that explicitly requested by the user. The unchecked caching policy is safe, as long as each derived run-time constant is a pure function of some set of annotated variables. An annotated variable can be assigned a static expression, in which case it is treated (more efficiently) as a derived run-time constant with a CacheOneUnchecked policy, instead of its annotated caching policy.

Assignments to root annotated variables violate the assumption that a derived run-time expression is a function of a set of root annotated variables. In this case, the derived run-time constants need to be dropped from the set of static variables, and annotated derived run-time constants need to be assigned new cache policies; preferably, the system meets the cache policies of their prior root variables. The analysis tracks the set of root annotated variables, SourceRoots, on which a derived run-time constant depends; whenever a root variable is (possibly) assigned to or is removed from the division, all dependent run-time constants are dropped (or restored to their regular caching policy, if roots themselves). This distinction between root and derived variables is a significant source of complexity in the analysis.

Computation of Demotions

At each program point, the analysis computes the set of demoted variables. A variable can be demoted in two ways: (1) if it was static before the point but is dynamic after the point (svi–svo in the equations), or (2) if it becomes static at the node but is dropped from the set of static variables right after the node because of filtering of live variables (svo–svf in the equations).

Additional Lattice Meet Operations

The Merge helper function uses the lattice meet operators for the Division and DivisionInfo domains. The lattice meet operator $\cap_{Division}$ over elements of Division indicates how to combine different annotations for a set of variables in the same division, and is defined as follows:

$$d_1 \cap_{Division} d_2 \equiv \{(v,p) | v \in dom(d_1) \cap dom(\mathrm{d}_2) \hat{} p = d_1(v) \cap_{Policies} d_2(v)\}$$

Elements of Policies are met point-wise. Elements of individual policy domains are totally ordered, with elements listed earlier in the set of alternatives for a domain in FIG. 11 ordered less than elements listed later; for example:

$$\mathrm{AutoPromote} \leq_{PromotionPolicy} \mathrm{ManualPromote}$$

Thus, the lattice meet operator for a particular policy domain returns its smallest argument, for example:

$$\mathrm{AutoPromote} \cap_{Promotionpolicy} \mathrm{ManualPromote} = \mathrm{AutoPromote}$$

This rule has the effect of picking the strongest policy of any of the merging divisions.

The lattice meet operator $\cap_{Divisioninfo}$ over elements of Divisioninfo is the point wise meet over its component domains, which are defined as follows:

$si_1$ ∩StaticVarInfo $si_2$ ≡
let $si_{new}$ =
{ (v, (p,rvs)) | v∈dom($si_1$)∩dom($si_2$) Λ
P = $P_1$ ∩CachingPolicy $P_2$ Λ
rvs = $rvs_i$ ∪ $rvs_2$
where $P_2$ = CachingPolicy($si_2$(v))
$P_1$ = CachingPolicy($si_1$(v))
$rvs_1$ = SourceRoots($si_1$(v))
$rvs_2$ = SourceRoots($si_2$(v))}
$vs_1$ ∩Promotions $vs_2$ ≡ $vs_1$∪$vs_2$∩dom($si_{new}$)
$vs_1$ ∩DiscordantVars $vs_2$ ≡ $vs_1$∪$vs_2$∩dom($si_{new}$)
$vs_1$ ∩Demotions $vs_2$ ≡ $vs_1$∪$vs_2$ Reachability Analysis The system identifies static merges by computing a static reachability condition at each program point for each division. A static reachability condition is a boolean expression (in conjunctive normal form) over the static branch outcomes, which are required in order to reach that program point. A static branch is a branch whose test variable is identified as a run-time constant by the BTA analysis. A static merge is one whose predecessors have mutually exclusive static reachability conditions. A merge is static for a particular variable x with respect to a given division if and only if at most one possible definition reaches the merge, or different incoming potential definitions are along mutually exclusive predecessors. Reachability conditions are computed at the same time as the BTA information, since they depend on the BTA's division and static variable analysis and influence the BTA analysis's treatment of merge nodes.

Creating the Generating Extensions

Given the output of the BTA analysis, DyC statically constructs the code and static data structures that, when executed at run time, will call the run-time specializer with the appropriate run-time constant arguments to produce and cache the run-time specialized code, i.e., the generating extensions. With reference back to FIG. 2, the generating extensions are created by the generating extension section of DyC's Multiflow compiler, using the following steps.

A split divisions step is first performed in a block 228. The compiler statically replicates control flow paths, so that each division receives its own code. After replication, each program point corresponds to a single division. Replication starts at entries to specialized functions (producing several distinct functions), and at merge points where different divisions combine. Replicated paths remerge at points where divisions cease to differ and are joined by the Merge function.

In a block 230, the compiler identifies which branch successor edges should be lazy specialization edges. Lazy points (due to dynamic-to-static promotions) are identified. The compiler also identifies the boundaries of the units manipulated by the run-time specializer (described above), as shown by a block 232. Unit boundaries primarily correspond to dynamic-to-static promotion points, eviction points (where variables are evicted from the set of annotated variables), specializable merge points, and lazy branch successor edges. The first three cases are cache lookup points, and the last case avoids speculative specialization. A clustering algorithm then attempts to merge boundaries together to minimize their cost. The Unit and UnitEdge specializer data structures are generated at the end of this process. Further discussion concerning the identification of lazy edges is presented below.

Next, the process flows to a block 234, wherein the compiler separates the static operations (OpNodes whose right-hand side expressions were computed to be static by the BTA analysis) and the dynamic operations into two separate, parallel control flow sub-graphs. These sub-graphs are respectively called "set-up code" and "template code." Further aspects of this separation are discussed below. Also discussed below is the method the system uses for determining the control flow of the static sub-graph, after all dynamic branches have been removed from it.

In a block 236, the compiler inserts explicators in the dynamic sub-graph for all variables in the Demotions set at each program point. For Demotions sets at merge nodes, each assignment must be inserted on each predecessor edge to the merge where the now-dynamic variable was previously static.

The DC operations needed to complete the implementation of Specialize, such as cache lookups, memory allocation, and branch patching, are inserted into the static and dynamic sub-graphs before they are passed through the back end of the compiler, as shown by a block 238. Some optimizations of the calls to the run-time specializer are discussed below. The primary steps for generating extensions is thus complete.

The next step is performed by back end 208, wherein Multiflow's combined register allocator and instruction scheduler optimizes the ordinary static code, the static code to be executed by the run-time specializer, and the dynamic code. A post-pass integration step that follows assembly code generation is performed in block 216, to integrate the dynamic code into the static specializer code so that the dynamic code is emitted at run time when the corresponding static code is executed by a generating extension. In this integration step, each unit's ReduceAndResidualize function is completed. The control flow and the reduce operations of the ReduceAndResidualize function are derived from the static control flow sub-graph. The residualize operations are introduced by translating the operations and dynamic branches of the dynamic sub-graph into code to emit the dynamic instructions (perhaps with run-time constant operands) in the static sub-graph; this process is described in more detail below. The resulting sub-graph forms the ReduceAndResidualize function for the unit, and the dynamic sub-graph is discarded.

Computing Lazy Branch Successors

Laziness policies on variables indicate the extent of speculative specialization that should be performed after dynamic branches. Based on these policies, successors of some dynamic branches are determined to be lazy edges, each of which corresponds to a one-time suspension and resumption of specialization at run time.

A branch successor edge is lazy if and only if its test variable is dynamic and at least one of the following conditions holds.

(1) At least one of the run-time constants at the branch is annotated with the Lazy policy, (2) The branch successor edge determines execution (as defined below) of a predecessor edge of a later specializable merge node, where at least one of the discordant variables is annotated with the SpecializeLazy policy, (3) The branch successor edge determines execution of a predecessor edge of a later specializable loop-head merge node, where at least one of the discordant variables is annotated with the LoopSpecializeLazy policy, or (4) The branch successor edge determines execution of a later call to a specialized division of a procedure, and some run-time constant live at the call is not annotated with the Eager policy. A branch successor edge determines execution of a program point if and only if the edge is "postdominated" by the program point, but the branch node itself is not, i.e., the branch successor is (one of) the earliest point(s) where it is determined that the downstream program point will eventually be executed. Once the postdominated information relating program points is computed, a linear scan over the dynamic branches, specializable merge points, and specialized calls serves to compute the lazy edge information.

Unit Identification and Automatic Positioning of Cache Lookups

It is often preferable to cache dynamically generated code, so that it can be reused without having to perform additional dynamic compilations on the same code segment, both at the program point at which the code is generated and by other program points that need identical code, such as multiple calls sites for the same function. In determining caching points, the system considers both the savings due to code reuse and the cost of using and maintaining the cache. Reuse is achieved by caching the specialized code when it is dynamically generated and then performing a cache lookup, based on the values of the static variables, to retrieve the cached specialized code when the code is executed again.

A cache lookup compares the current values of the static variables (variables whose values are used for run-time specialization) with previous sets of values that have been used to generate specialized versions of the code following the current program point. The purpose of performing cache lookups during run-time code generation is to avoid producing redundant code, which takes time and occupies storage space. However, cache lookups also take time, so it is desired that they not be used with excessive frequency. The method described below is a technique for selecting where to insert cache lookups in the process of performing run-time specialization for a particular piece of code, and is independent of how the cache lookups are implemented.

The first step for positioning cache lookups is to identify points in the region of the program to be dynamically compiled, called caching points, where the potential for reuse may arise. This step is performed during the BTA. Initial placement of these caching points coincide with unit boundaries, which are identified as follows:

(1) A transition, called a lazy point, from executing (statically or dynamically generated code) to generating code. Before dynamically generating the code, the system checks in the reusable code cache to see if the code has been previously specialized to identical static-values. If they have changed, then new static values, call promoted values, must be passed to the dynamic compiler, so that code that is specialized to the new values can be dynamically compiled. Lazy points where values are promoted are called promotion points. A non-empty Promotions set at a program point corresponds to a dynamic-to-static promotion point, and introduces a unit boundary.

(2) A procedure entry. The procedure could be invoked again with the same parameter values and other (global) values for which it has been specialized.

(3) A merge of control paths on which static variables could be assigned the same values. Under this condition, the code that follows would be the same for both paths. A non-empty DiscordantVars list corresponds to a specializable merge point, and introduces a unit boundary.

(4) A program point that occurs after a static variable has become either dynamic (i.e., it is no longer used for specialization) or dead (i.e., it is no longer used at all). Static variables that meet this criteria are called evicted variables. If an evicted variable was not a pure function of other static variables, then eliminating it from the set of specialized values could eliminate differences between specialized versions of the code that follows.

Any point where the cache context differs from the cache context at a predecessor point is a unit boundary, since different degrees of polyvariant specialization or of cache retention can occur. If any static variable is annotated with the CacheAllUnchecked policy, then the cache context is the special marker replicate. Otherwise, the cache context is the pair of the set of variables annotated with the CacheAll policy and the set of variables annotated with the CacheOne policy. (The set of variables annotated with CacheOneUnchecked do not contribute to the cache context.) In practice, the rule concerning different cache contexts can be relaxed since, except at promotion points, these boundaries are not required. Unit boundary clustering (see the next subsection) also helps to mitigate the impact of the many of the boundaries that are caused to be inserted by this rule.

It is noted that a program point can be a boundary in more than one way. In addition, units are constrained to be single-entry regions. To ensure this constraint is met, additional unit boundaries are inserted at control flow merges of paths (including loop back edges) from different units. These unit boundaries can be omitted, however, if all paths from different units have mutually exclusive static reachability conditions (the same way it is determined that multiple static definitions are not truly discordant, as discussed above). Omitting such unit boundaries eliminates the overhead associated with crossing the omitted unit boundaries (discussed in the next subsection), and permits program points to be shared among multiple units, at the cost of larger generating extensions.

A UnitEdge data structure records whether each unit edge should be specialized eagerly or lazily. A unit boundary is eager, unless it is a promotion point (which must be suspended until the computed run-time value is available) or a lazy edge.

Coalescing Caching Points by Clustering Unit Boundaries

A unit boundary introduces run-time specialization overhead—to package the run-time constant context from the exiting unit's ReduceAndResidualize function, to execute the run-time specializer and any cache lookups, and to invoke the target unit's ReduceAndResidualize function (unpacking the target's run-time context). In some circumstances, series of unit boundaries can be created with little if any work intervening, for instance when a series of annotated static variables become dead, leading to a series of eviction points and corresponding unit boundaries.

To avoid excessive unit boundaries, the system attempts to combine multiple boundaries whenever possible. This goal is accomplished by a unit boundary clustering algorithm, which works as follows.

First, for each boundary, a range over the procedure where that boundary can be legally moved is constructed. Procedure entries, specializable merge points and lazy edge boundaries cannot be moved, so their range is a single program point. Eviction and promotion points can move to any control equivalent program point (i.e., a program point with the same control dependencies) that is bounded by earlier and later uses of the evicted or promoted variables, respectively; however, promotion points cannot move above earlier definitions. It is preferable to delay inserting the single-entry producing unit boundaries until after all of the other boundaries have been clustered, so they do not participate in the clustering algorithm.

Second, the system sorts the boundary ranges in increasing order of their ends, and then makes a linear scan through this sorted list. The system removes the range that ends first in the list (the kernel range), removes all other ranges that overlap with the kernel range (the union of these ranges forms a cluster), and finds the intersection of these ranges. This resulting intersection is the program region where the caching points can be placed. It is preferable to use the earliest possible points for evictions and later points for promotions, as these will reduce the amount of specialized code. The system chooses either the start or end of the intersection range, based on the relative mix of promotions and evictions, and inserts a single caching point for all the merged ranges at that point. Then it continues processing the sorted list of boundary ranges, until the list is exhausted.

This algorithm for coalescing boundary ranges produces the minimum number of unit boundaries possible, given the restricted kinds of ranges produced in the first step (the restriction to control equivalent program points is key). To prove this, note that the system produces a cluster if and only if it detects a kernel range, so that the number of clusters is equal to the number of kernels. Since kernels never overlap, no clustering scheme could place two kernels in the same cluster. The number of kernels is therefore also the minimum number of clusters required, implying that the algorithm produces no more clusters and, therefore, no more boundaries than necessary.

Because caching points may be placed at unit boundaries, moving them can increase or decrease the amount of code reuse. Thus, clustering sometimes trades off reuse for fewer boundary crossings. It may be desirable to limit the length of the ranges so that boundaries sufficiently far from each other are not coalesced, or otherwise limit the length of the ranges to prevent different types of boundaries that are relatively distant from each other from being clustered together. For example, it may not be beneficial to combine distant boundaries due to evictions and promotions, since eviction boundaries must occur earlier and promotion boundaries later, in order to maximize reuse. As an alternative, the foregoing algorithm could be modified to only introduce boundaries at predetermined locations, such as eviction points.

More elaborate versions of the clustering algorithm could permit coalescing of unit boundaries beyond control equivalent regions, but this variation would require more than a straightforward extension to the algorithm presented above. The ranges would no longer be strictly linear. Moving boundaries below branches or above control flow merges would create identical boundaries on all paths from the branches or to the merges. Moving boundaries in the opposite direction could only be permitted if identical boundaries existed on all the paths.

An example illustrating the clustering of unit boundaries based on promoted and evicted variables is shown in FIG. 12. In this example, a variable is evicted because the variable becomes dead, i.e., it is not used downstream. The left-hand side of FIG. 12 represents a CFG comprising a plurality of unit blocks of code, including blocks B1, B2, B3, B4, and B5. Each unit block comprises a definition of one or more variables (i.e., "x=. . . ") and/or one or more lines of code operating on a previously-defined variable (i.e., ". . . x . . . "). Blocks B1, B3, and B5 are control equivalent blocks.

Two (or more) blocks are control equivalent if the execution of one of the blocks guarantees that execution of the other blocks will occur. In this case, execution of block B1 guarantees that execution of blocks B3 and B5 will occur, no matter what path is taken. Conversely, execution of blocks B2 and B4 are not guaranteed. Furthermore, blocks B2 and B4 are not control equivalent, because execution of either of blocks B2 or B4 does not guarantee execution of the other block.

Each definition of a variable is assumed to cause a promotion for that variable. The allowed range of movement for each boundary is denoted by the double-headed arrows. For each variable v, $v_p$ denotes the legal range of motion for the boundary induced by promotion of the variable, and $v_e$ denotes the range for the boundary induced by eviction of the variable. Note that a promotion-induced boundary $v_p$ ranges between the definition of v, which caused the promotion, and the first use of v. Furthermore, the boundary may only be moved to (and merged with) a control equivalent program point. Therefore, the range for $y_p$ ranges from the middle of block B1 to the end of block B3, but not into block B5, due to the intervening use of y in block B4. Blocks B2 and B4 are excluded from the allowed range for $y_p$ since they are not control equivalent to block B1.

Given the foregoing input specification, the algorithm works as follows. The algorithm first clusters boundaries in block B1 and blocks that are control equivalent to block B1, i.e., blocks B3 and B5. The ranges corresponding to these control equivalent blocks (both promoted and evicted variable ranges) are sorted by their respective end points, starting with the earliest (beginning at the bottom of the flow graph, working towards the top) end point. Note that ranges $w_p$ and $w_e$ are not eligible to be coalesced with these ranges, since they are in a block (B2), which is not control equivalent to block B1. At the end of this step, the ranges are arranged as in a list L, following the form L=($y_e$, $x_e$, $z_e$, $z_p$, $y_p$, $x_p$).

The algorithm next picks $y_e$ from L, since it ends first, and determines which ranges overlap with $y_e$ at its end points; in this case, $x_e$ and $z_e$ are the overlapping ranges. The intersection of these three ranges is simply the range $y_e$. Finally, since all three of these ranges are eviction-based ranges, the algorithm places a coalesced boundary point $CB_1$ at the start of $y_e$. The coalesced ranges $y_e$, $x_e$, and $z_e$ are then removed from L, so that L=($z_p$,$y_p$,$x_p$).

Of the remaining ranges in L, the one with the earliest endpoint is $z_p$. At the point where $z_p$ ends, it intersects only with $y_p$. The intersection of the ranges $z_p$ and $y_p$ results in the range $z_p$. A coalesced boundary point $CB_2$ for ranges $z_p$ and $y_p$ is placed at the end of $z_p$, since this is a promotion-based boundary.

After removing $y_p$ and $z_p$ from L, the remaining range for this set of control equivalent blocks is $x_p$. $x_p$ can therefore not be coalesced with any range. Therefore, a coalesced boundary point $CB_3$ for $x_p$ is simply placed at the end of the range $x_p$.

The system now examines the blocks that are not control equivalent to block B1, i.e., blocks B2 and B4. Block B2 is first selected. There are no other blocks that are control equivalent to block B2. Additionally, the boundary ranges in block B2, $w_p$ and $w_e$, have no other boundary ranges that could potentially be merged with ranges $w_p$ and $w_e$. List L in this case is simply $L=(w_e,w_p)$. Since we and $w_p$ do not overlap, the algorithm simply results in a coalesced boundary point $CB_4$ at the beginning of $w_e$ and a boundary point $CB_5$ at the end of $w_p$. The remaining block (B4) has no boundaries in it, so the process is complete. The caching points are then placed at the coalesced boundaries defined above by the algorithm.

Separating Static and Dynamic Operations

For most straight-line operations, it is clear whether the operation is static or dynamic. However, call instructions are trickier. A call to a regular unspecialized function (or to the unspecialized version of a specialized function) is treated as a dynamic operation and appears only in the dynamic sub-graph. A call to a constant function (or one annotated with @) with static arguments is treated as a regular static computation, appearing only in the static sub-graph. A call to a particular specialized division of a function has both static and dynamic components. To implement such a call, the call operation is split into two separate calls, one static and one dynamic. The static version of the call invokes the statically compiled generating extension for the selected division of the callee, taking as arguments the division's static arguments and returning a static procedure address. This step is followed by a dynamic call that invokes the static procedure address and passes the remaining arguments to produce a dynamic result. The static call will be moved to the static sub-graph, and the dynamic call will appear in the dynamic sub-graph. Control flow nodes, including branches and merges, initially are replicated in both the static and the dynamic sub-graphs. Later transformations can optimize them.

Determining Control Flow of the Static Sub-graph

Once each unit has been identified and split into separate static and dynamic control flow sub-graphs, the control flow structure of the unit's ReduceAndResidualize function is computed. Static and dynamic branches in the unit receive different treatment. A static branch is taken at specialization time, and does not appear in the dynamically generated (residual) code; accordingly, only one of its successors produces dynamically generated code. Consequently a static branch appears as a regular branch in the final ReduceAndResidualize function, selecting some single successor to pursue and residualize. A dynamic branch, on the other hand, is emitted as a regular branch into the dynamically generated code, and both its successors must be residualized. Consequently, no branch appears in the ReduceAndResidualize function at a dynamic branch, and the successors of the dynamic branch are linearized instead.

In the presence of arbitrary, unstructured control flow with mixed static and dynamic branches, this linearization process may require some code duplication to avoid maintaining specialization-time data structures and overhead. The algorithm first splits all static control paths within the unit, linearizing dynamic branches by topologically sorting their successors, then re-merges the common tails of the static paths, bottom-up. A static control path includes all dynamically reachable basic blocks, given particular decisions for all static conditional branches. Each static branch can appear on a static control path at most once, because units cannot contain static loops. The time required by the algorithm can be exponentially related to the maximum number of sequential static branches on any static control path within a single unit, which is expected to be a small number in practice.

The next step performs a linearization of the separate branches. Linearization causes what were originally alternative code segments (i.e., blocks that shared a common dynamic branch) to be executed sequentially. The algorithm must ensure that the segments executed earlier do not alter the initial static state expected by subsequent alternative segments. This constraint can be achieved by saving the static state at each dynamic branch and restoring it before executing each branch successor, which is the approach that the algorithm uses to propagate the static context between units. However, within a single unit, a more efficient solution is possible if static variables are converted to SSA form. SSA form ensures that only one assignment is made to each variable, which implies that state changes made by segments that occur earlier in the linearized unit are made to variables not read by alternative segments. In this case, the SSA form is easy to compute, because issues arising from loops and aliasing can be safely ignored due to DyC's restrictions on the form of units (i.e., units cannot contain static loops) and its prohibition of static stores. If these restrictions were eased, however, an alternate solution might have to be found.

FIGS. 13A–13B graphically portray the before and after results of an exemplary set of code blocks that have been split and linearized by a system employing the algorithm described above. The process begins with the non-linearized sub-graph shown in FIG. 13A, which comprises six numbered boxes 1, 2, 3, 4, 5, and 6 that respectively represent basic code blocks 401, 402, 403, 404, 405, and 406. A circle 408 enclosing an "S" represents a static branch, while a circle 410 enclosing a "D" represents a dynamic branch.

As shown in FIG. 13B, the splitting process creates two separate branches below static branch of circle 408. Since block 406 is originally (see FIG. 13A) common to both branches, it is necessary to create a duplicate block 406' of block 406. The linearization process linearizes execution of blocks 404 and 405, which were previously common descendents of the dynamic branch of circle 410 (now removed).

Integrating Dynamic Code into Static Code

To produce the final code for a unit's ReduceAndResidualize function, the system uses the linearized static CFG, which computes all the static expressions, and blends in code to generate the dynamic calculations with the appropriate run-time constants embedded in them. To accomplish this step, the system maintains a mapping from each basic block in the dynamic sub-graph to a set of corresponding basic blocks in the static sub-graph. When splitting apart static and dynamic operations, each dynamic block is mapped to its static counterpart(s). Unit linearization may create multiple instances of a basic block in the static sub-graph, as discussed above. The mapping is updated as the static sub-graph is linearized and some blocks are replicated, and as the sub-graphs are optimized, through instruction scheduling. The two sub-graphs are integrated, one dynamic block at a time. First, the static code computes any run-time constants used in the block's dynamic instructions. Then, code to emit the dynamic block is appended to its corresponding static block.

The code to emit a dynamic instruction embeds the values of any small run-time constant operands into the immediate field of the emitted instruction. If the run-time constant is too large to fit in the immediate field, code is emitted to load the run-time constant from a global table into a scratch register. The emitted instruction then reads the scratch register to access the run-time constant. The emitting code also performs any peephole optimizations that are based on the run-time constant value, such as replacing multiplications by constants with sequences of shifts and adds.

FIG. 13C illustrates the split and linearized sub-graph of FIG. 13B after it has been integrated (i.e. merged). Note that the right-hand branch is still linearized, while block 406 once again becomes a common descendent of both branches.

Optimizing Specializer Interactions

Each initial promotion point at the entrance to a dynamic region is implemented by generating a static call to the run-time specializer, passing the run-time values of the cache context at that program point. The specializer section above described the run-time specializer as if a single, general purpose specializer took control at this and all other unit boundaries. The system optimizes this pedagogical model as follows.

The Specialize function is specialized for each Unit argument. All the run-time manipulations of the Unit and UnitEdge data structures are eliminated, the unit's Reduce-AndResidualize function is inlined, and the processing of outgoing lazy unit edges is inlined. If the cache policy for any of the unit's context variables is CacheAllUnchecked, then the cache lookup and store calls are omitted.

Rather than recursively call Specialize, a pending-list is used to keep track of unprocessed (eager) unit edges. Furthermore, the overhead of pushing and popping the static context on and off the pending-list can be avoided for one successor of each unit, which eliminates more than half of this overhead in dynamic regions without dynamic switch statements. In addition, ends of dynamic regions are compiled into direct jumps to statically compiled code.

Enabling On-demand (Lazy) Specialization Across Arbitrary Control flow Edges

It is often desirable to defer specialization of arbitrary program parts until those parts are guaranteed to be executed. The system preferably uses lazy specialization to accomplish this objective. Lazy specialization provides faster specialization, enables aggressive specialization that depends on interleaving execution and specialization, guarantees termination of certain aggressive forms of specialization, and reduces the amount of space occupied by the specialized code.

Lazy specialization enables specialization of promoted static variables whose values may only be known when the thread of execution reaches the code awaiting lazy specialization. The value of a promoted static variable at a given program point may change many times during execution of the program. Lazy specialization can produce optimized code for each of these values and also enables deferred specialization of parts of the code that may not be executed, thereby reducing both the amount of specialized code produced and the overhead of producing it. In particular, it enables an aggressive form of loop specialization, termed complete loop unrolling, wherein each iteration of the loop is specialized on demand, as it is about to execute. In the absence of lazy behavior, specialization by complete loop-unrolling is not guaranteed to terminate.

In most prior art systems, specialization akin to lazy specialization as used in the present invention is restricted to specializing entire functions on different values of function arguments. However, as is done in a preferred embodiment of the present invention, it is often beneficial to lazily specialize parts of a program smaller than a function. Such parts may include a rarely taken side of a conditional branch, separate iterations of a loop, or a fragment of code within a function that uses a static variable.

Some prior art systems do allow a limited set of optimizations other than specialization to be performed lazily on arbitrary parts of programs. However, when these systems resume optimization after the deferral, they cannot use optimization information computed before the deferral, produce optimized code for different instances of this optimization information, or defer optimization again when optimizing the initial deferred part of the program. Without these capabilities, these systems cannot add to their repertoire of optimizations any specialization that specializes effectively across a deferral, specializes on promoted static variables, or provides complete loop-unrolling that is guaranteed to terminate.

As noted above, DyC supports specialization of arbitrary program fragments, not just of entire functions. Further, because the system has a mechanism to propagate information across deferrals (called the context of specialization), it can both propagate optimization information across deferrals and specialize on promoted static variables (the many values of which correspond to different contexts). Finally, the system is capable of deferring specialization while specializing code that is already deferred, thereby enabling complete loop unrolling. This capability is referred to as nested laziness.

DyC's Implementation of Lazy Specialization

Given a CFG representation of a program, and a particular edge in the CFG that connects two basic blocks, the system provides a mechanism for eagerly specializing the source block of the edge, while deferring the specialization of the destination block until the specialized version of the source block and the edge are executed (i.e., a mechanism for lazy specialization). The system replaces the edge with code that generates, immediately after the source block is specialized, i.e., with a stub.

The stub, when executed, gathers values of variables that comprise the context of specialization of the destination block and invokes a routine to specialize the destination block with respect to the context. If possible, the stub patches in a direct branch from the specialized version of the source block to the specialized version of the destination block, so that in future traversals of this edge, the stub may be bypassed. Finally, the stub jumps to the newly specialized version of the destination block.

In more detail, consider an edge $E_{12}$ that connects two basic blocks, $B_1$ and $B_2$, as shown in FIG. 14. Suppose both $B_1$ and $B_2$ are to be specialized, but specialization will be suspended across $E_{12}$, thereby making $E_{12}$ a lazy edge. In other words, $B_2$ will not be specialized until both the specialized version of $B_1$ has been executed and the execution seeks to continue across edge $E_{12}$. FIG. 15 illustrates the logic used by the system to transform the sub-graph shown in FIG. 14 into a sub-graph, which, when executed, achieves suspended specialization across edge $E_{12}$.

The logic begins in a block 500, which invokes a procedure to generate a specialized version of $B_1$ called version $B_1'$, based on the specialization principles discussed above.

The execution of $B_1$' computes values that constitute the context that will be used to specialize block $B_2$. The code to construct this contact is generated, as noted in a block 502. In a block 504, the system patches the branch at the end of $B_1$' to point to the beginning of the context-gathering code that was generated in block 502.

The code generated in block 502 is the beginning of the stub that will be executed if the execution of $B_1$' is followed by a traversal of edge $E_{12}$. The next part of the stub is generated in a block 506, and comprises code that invokes the specialization mechanism to specialize $B_2$ with respect to the context just constructed. This specialized version of $B_2$ is called $B_2$'. Note that if $B_2$ has a lazy edge emanating from it (i.e., it has nested laziness), the mechanism in FIG. 15 would suspend specialization across that edge as well. Specialization of deferred code can thus itself be lazy.

The logic next proceeds to a decision block 508, which determines whether edge $E_{12}$ is one-time lazy. If the context for specializing $B_2$ will be unchanged on all subsequent executions of $B_1$', edge $E_{12}$ is termed one-time lazy, and the system can patch the stub so that it will not be executed during future traversals of edge $E_{12}$. If the answer to decision block 508 is yes, the logic flows to a block 510, which generates code to patch the branch at the end of $B_1$' to point to the beginning of $B_2$', thus bypassing the stub in future traversals of edge $E_2$. If the answer is no, block 510 is skipped, and the logic proceeds to a block 512, which generates a jump to $B_2$', so that $B_2$' is to be executed after the stub is executed. The logic also proceeds to block 512 after completion of block 510, if applicable. The process is completed in a block 514, which specializes any other blocks than can be specialized with $B_1$ without deferral.

The code example in FIG. 16 illustrates an implementation of the lazy specialization process described above. In particular, this example shows how stubs are generated to achieve suspension of specialization, and how these stubs are replaced by specialized basic blocks once specialization resumes.

In FIG. 16, an exemplary function, foo(x,y), has a CFG comprising three basic blocks B11, B12, and B13, connected by edges 600 and 602. It is assumed that a programmer specifies (e.g. by the make_static annotation shown) that the body of the function will be specialized with respect to a variable x. Furthermore, it is assumed that block B3 will be infrequently executed, and that the programmer has chosen to specialize the if(y) branch lazily (using the "lazy" policy in the annotation). The effect of specializing a branch lazily is to suspend specialization across any edge of the branch that has not been traversed at least once at the time of specialization. Therefore, the first time foo() is invoked, specialization will be suspended across edges 600 and 602. FIG. 17 illustrates the stubs (labeled stub-B12 and stub-B13) generated by the system to effect the suspension of specialization; the stubs are respectively connected to a specialized version of block B11, labeled B11', by edges 604 and 606.

Now suppose that the specialized code in FIG. 17 is executed. Suppose also that the common case holds, and edge 604 is traversed, causing stub-B12 to be executed, leading to the creation (and execution) of a specialized version of B12 (labeled B12'). Stub B12' takes the place of stub-B12. As shown in FIG. 18, in future calls to foo() (if the common case holds), execution will traverse an edge 608, causing the specialized code B12' to be executed without entering stub-B12.

Finally, suppose the uncommon case (traversal of edge 606) eventually holds, causing stub-B13 to be executed. A specialized version of block B13, called B13', will then be created and executed. As shown in FIG. 19, stub-B13 will be replaced by block B13', creating a new edge 610, so that subsequent instances of the uncommon case will cause execution to directly flow to block B13'. At the end of this process, foo() will have been completely specialized, with no specialization deferred further along either branch edge.

The principles presented above regarding lazy specialization can be applied to other program conditions. For instance, the notion of a value of a variable (on which specialization takes place) can be broadened to include class, type, or similar abstract properties of the variable. The context information gathered and passed can have any of these kinds of information. Furthermore, the run-time optimizations performed need not be restricted to specialization. Any run-time optimization that benefits from deferring optimization across certain branches can benefit from these principles. For these optimizations, the system provides the benefits of lazy optimization at arbitrary program points, of propagating optimization information across deferrals (through the context, which in this case would contain the particular optimization information), and of nested laziness.

Conditional Specialization

It is often the case that it is unknown at compile time whether it would be advantageous to apply specialization at run time. In order to overcome this problem, the system provides a method for implementing conditional specialization, whereby a programmer can have code portions dynamically specialized based on arbitrary compile-time and run-time information. The method preferably uses extensions to the C programming language to specify the conditions on which specialization should depend, thereby enabling a programmer to decide when it is profitable to specialize.

The two opposing factors that usually determine whether conditionally applying an optimization will be beneficial are the reliability of the condition, and the run-time overhead necessary to apply the optimization. A reliable condition is often difficult to make at static compile time, which can formulate conditions based only on compile-time information. On the other hand, compile-time conditions incur no run-time overhead. Run-time conditions are more reliable, because more information about the program's state and behavior is available at run time. The price of deferring the optimization until run time, however, is the run-time cost in applying the optimization.

The method used in a preferred embodiment of the present invention enables conditional run-time specialization, but without creating a large run-time overhead. It relies on both compile-time and run-time information to formulate the condition and evaluates the condition at run time, resulting in a more reliable forecast of the performance benefits of specializing a program. However, it does the bulk of the analysis to apply specialization at compile time, in order to reduce the run-time cost of specialization. Finally, it applies conditional specialization to a program scope of arbitrary granularity.

Implementation of Conditional Specialization

The present system enables a programmer to insert the conditions under which the specialization should be applied to a program in the form of source code statements. With reference to FIGS. 20A and 20B, a decision block 700 comprises one or more conditional statements 702, which are arbitrary combinations of compile-time and run-time expressions that are evaluated by the compiler and executed at run time as ordinary program expressions. One or more conditions can govern the same specialization, the same condition can control multiple specializations, and multiple conditional specializations can be applied to the same body of code.

The conditions must be annotated so that the run-time specializer can easily differentiate them from normal program code. The system employs source level annotations to identify the conditions that determine whether specialization should occur. Additional source level annotations are similarly employed to control the specialization process (i.e., to set policies that guide the specialization analyses and the run-time specializer), and to delineate the desired scope of specialization, as indicated by a "<DO SPECIALIZATION>" label 704, as shown in FIGS. 20B, for producing the specializer stub and optimized code, respectively.

If the condition or conditions corresponding to a specific specialization are evaluated by the system to be false, the original program code (represented by an original code block 706) is not modified. Conversely, if the evaluation of the condition or conditions is true, specialization is performed on the code sections that correspond to the conditions, based on the annotated code in the conditions and used to control the specialization.

The following pseudocode segment illustrates the general format for placing annotated conditions and specialization within a program's original source code.

```
if (<conditions for specialization/>) then
    <do specialization 1>
else   if (<conditions for specialization 2>) then
    <do specialization 2>
else
..
endif
<code to be conditionally specialized>
...
```

FIG. 22 shows a flowchart for illustrating the logic the system uses for implementing conditional specialization. The process begins in a block 708, which copies the code that will be specialized. The start portion of the code to be copied is located immediately following the control flow merge following the condition. Copying of code is continued until the end of the desired scope of specialization is reached, or until the specialization is known to no longer have an effect.

Next, specialization analysis is applied to the copy in a block 710. The copy is analyzed for run-time specialization, applying both traditional specialization analysis (i.e., binding time analysis) and analyses driven by the annotations (e.g., analyses that are used to determine whether and when to cache specialized code).

The logic proceeds to a block 712, which creates a run-time specializer from the analyzed copy that will dynamically generate a specialized version of the copy. The process is completed by a block 714, which creates a specializer stub. The specializer stub is prepended to the run-time specializer and either executes the run-time specializer, or dispatches to a previously created specialized version of the copy. The results of the process are shown in FIG. 20B, wherein the original code now additionally includes a specializer stub 716 and a run-time specializer 718.

The principles discussed above concerning conditional specialization can be modified or extended in several ways. The invention can be used to conditionally prevent specialization from being applied. In the foregoing example the conditions and annotations are inserted manually. Alternatively, conditions and/or annotations can be inserted automatically, based on run-time profiling information or by compiler analysis. Specialization can also occur at arbitrary points before the control flow merge following the condition, rather than at the merge. The code to be specialized can be copied at some other time than immediately before the analysis.

Compile-time Optimizations

The method described above for conditional specialization based on a combination of run-time conditions and compile-time analysis can also be applied to other optimizations, more specifically in terms of an arbitrary compile-time optimization. The primary difference between compile-time optimization and the foregoing method is that the optimization is applied directly to the copied code, instead of replacing the copied code with a stub and a run-time specializer. Once the desired conditions are inserted into the program source and annotated (as shown in FIG. 21A, for the case where the conditions are not met), the following steps are applied to implement the conditional optimization.

1. From the control flow merge following the condition, split the merging paths by copying the code that follows, creating a new copy of the code to be optimized and executed when the specified conditions hold. Stop copying when the end of the desired scope of optimization is reached, or when the optimization is known to no longer have an effect. The new copy of the code will be optimized and then executed whenever the specified conditions hold.
2. Apply the optimization described by the annotations to the copy.
3. If the useful scope of the optimization was not accurately determined in step 2, re-merge needlessly copied code with the original.

The results of the process are depicted in FIG. 21B, which shows a block 720 comprising the optimized code that has been added to original code block 706.

Code Examples Demonstrating Conditional Specialization.

The following examples illustrate several possible kinds of conditions that can be checked. All of the conditions shown are simplified cost-benefit evaluations, but other conditions that indirectly indicate whether dynamic compilation would be beneficial could also be tested, such as a flag that specifies whether an initialization phase of the program has concluded.

Break-even Tests

If an a priori determination of an extent to which a dynamic region will be executed can be easily made, a break-even test can be used to establish an estimated break-even point, which identifies the amount of run-time specialized code that would have to be executed in order to fully recoup the cost of the dynamic compilation overhead required to produce such specialized code. The break-even point can be estimated by a detailed cost-benefit model of the dynamic-compilation system, or can be derived empirically from prior experience with an application being coded.

One example to which this analysis is applicable is a routine that applies a convolution to an image. The size of the image determines how many times its specializable inner loops are executed. The following code segment illustrates the application of a break-even test. (The conditional statements for this and the following examples are shown in bold.)

```
if (ImageWidth*ImageHeight > EstimatedBreakEvenpoint)
    make_static(ConvMatHeight, ConvMatWidth, ....);
```

-continued

```
for (ImageRow = 0; ImageRow < ImageHeight; ImageRow++) {
    for (ImageColumn = 0; ImageColumn < ImageWidth;
ImageColumn++) {
    /* Specializable inner loops over convolution matrix */
    for (ConvMatRow = 0; ConvMatRow < ConvMatHeight;
ConvMatRow++) {
        for (ConvMatColumn = 0; ConvMatColumn <
ConvMatWidth; ConvMatColumn++) {
                /* Convolution sum performed here */
            }
        }
    }
}
```

If an a priori determination of the extent to which the dynamic region will be executed cannot be easily made, then an educated guess as to whether the dynamic compilation overhead will be recouped by specialization can be made. For example, the system could be designed to perform a test each time a dynamic region is executed to check whether the dynamic region has been executed enough times so that specialization could have recouped its dynamic compilation cost. Optionally, other types of execution thresholds could be used, based on various criteria or observations, such as formulating a condition set based on an empirical analysis of program performance with and without specialization. The following code segment illustrates an example of conditionally specifying specialization based on the number of executions of a dynamic region exceeding an estimated break-even point.

```
if (++NumberOfExecutions>EstimatedBreakEvenPoint)
    make_static( . . . );
```

Code-size Tests

One result of run-time specialization can be that many specialized versions of a single portion of code are produced. For example, specialization can be used to perform complete loop unrolling, which results in the creation of a plurality of run-time generated code segments that collectively occupy much more space than the code in the original (rolled) loop. If the run-time generated code is larger than the instruction cache on a modern microprocessor architecture, the program's performance will likely be degraded. Conditional specialization can be used to avoid such performance degradation by testing whether the amount of code that is estimated to be generated is larger than the instruction-cache size (or at least large enough to produce significant conflicts with other code). If the number of iterations of a loop that could be completely unrolled in advance is known a priori, then a test such as the following could be used.

```
if (NumberofIterations*EstimatedLoopBodySize
    <InstructionCacheSize) make_static( . . . );
```

If the number of loop iterations is not known a priori, then they can be counted during specialization, and specialization can be halted when the number of loop iterations becomes too large, as demonstrated by the following code segment.

```
make_static(....);
while (....) {
    if ((++NumberofIterations)*EstimatedLoopBodySize >
            instructionCacheSize)
        make_dynamic(....);
        . . .
}
```

Tests for Exploitable Values

Certain optimizations, such as strength reduction, exploit particular run-time values, for example zero, one, or powers of two. Conditional specialization can test for these values so that the cost of dynamic compilation is not incurred when there are insufficient opportunities for optimization, as illustrated by the following code segment.

```
if (x==0§ IspowerofTwo(x)) make_static(x, . . . );
```

Combining Tests

More sophisticated cost-benefit evaluations can be employed by combining the conditions shown above, and/or using different conditions. For example, the convolution routine could test the sizes of the images transformed, check the size of a convolution matrix, and also look for zeroes and ones in the convolution matrix, as shown by the following.

```
NumberOfExecutions+=ImageWidth*ImageHeight;
if (NumberOfExecutions>EstimatedBreakEvenPoint &&
    ConvMatHeight*ConvMatWidth*EstimatedLoop
    BodySize<InstructionCacheSize &&
    ProportionOfZeroesAndOnes>0.2) make_static
    (ConvMatHeight, ConvMatWidth, . . . );
```

However, since the tests add run-time overhead to the execution of a dynamic region, it is desirable to keep the tests as simple as possible, while still retaining reasonable accuracy (i.e., not permitting specialization when it is not beneficial).

The above examples show only a few types of conditions that are possible. The mechanism that the system uses for conditional specialization permits arbitrary conditions that can be evaluated at compile time or run time, or in a combination of the two. The conditions can appear before the beginning of a dynamic region, within it, or both and can be placed on make_static or make_dynamic annotations. Code can accompany the annotations, as with ordinary conditional statements, i.e., the conditions and the annotations can be placed anywhere within ordinary code.

Dynamic compilation Example

The example presented below illustrates some of DyC's capabilities and shows how the annotation interface is used. LISTING 1 comprises a simplified version of an image-convolution routine pnmconvol that is part of a benchmark suite used to evaluate DyC's performance. The do_convol routine takes an image matrix as input, convolves it by the convolution matrix cmatrix, and writes the convolved output to the outbuf matrix. Since cmatrix is unchanged within the (outer) loops over image pixels, it is preferable to specialize the inner loops over the convolution matrix to the values contained in cmatrix.

The three DyC annotations inserted to accomplish this dynamic specialization are highlighted in boldface. A make_static annotation on a variable specifies to DyC that the code that follows should be specialized (polyvariantly) for all distinct values of that variable. The make_static annotation in this example indicates that the pointer cmatrix and its dimensions crows and ccols should be specialized upon in downstream code. Additionally, the make_static on the loop index variables crow and ccol results in the complete unrolling of the innermost two loops. An @ sign on an array, pointer, or structure dereference identifies a static load. In the example, the @ sign ensures that the result of dereferencing the static pointer cmatrix at the static offset (crow, ccol) is also static. Derived static computations and uses, identified by the BTA, are italicized. The dynamic region extends to the end of the loop over the convolution matrix, since no static variables are used beyond this point.

Listing 3 shows a source code representation of the dynamically compiled code produced for the dynamic region of LISTING 2 (the optimized code produced by DyC is actually in machine code format—source code is used here for readability) when do_convol is invoked with a 3×3 cmatrix that contains alternating zeroes and ones (zeroes in the corners). All the static computations in LISTING 2 have been folded away by specialization, static uses in dynamic computations (e.g., that of ccol and crow to index image) have been instantiated with their run-time constant values, and the loop over the convolution matrix has been completely unrolled. Completely unrolling the loop has eliminated the direct cost of branching and induction variable updating, but by making the loop induction variables crow and ccol static, it also indirectly has enabled the address calculations and load from cmatrix to be eliminated.

LISTING 1

```
/* Convolve image with cmatrix into outbuf */
void do_convol(
    float image [] [], int irows, int icols,
    float cmatrix[] [], int crows, int ccols,
    float outbuf [] []
    )
    {
    float x, sum, weighted_x, weight;
    int crow, ccol, irow, icol, rowbase, colbase;
    int crowso2, ccolso2;
    make_static(cmatrix, crows, ccols, crow, ccol);
    crowso2=crows/2; ccolso2=ccols/2;
    /*Apply cmatrix to each pixel of the image*/
    for (irow=0; irow < irows; ++irow) {
        rowbase = irow- crowso2;
        for (icol=0; icol < icols; ++icol) {
            colbase = icol- ccolso2; sum = 0.0;
            /*Loop over convolution matrix*/
            for (crow=0; crow<crows; ++crow) {
                for (ccol=0; ccol<ccols; ++ccol) {
                    weight = cmatrix @[crow] @[ccol];
                    x = image[rowbase +crow] [colbase +ccol];
                    weighted_x = x * weight;
                    sum = sum + weighted_x;
            }}
            /*End loop over convolution matrix*/
            outbuf[irow] [icol] = sum;
        }}
        /*End loop over image*/
    }
```

LISTING 2

```
/*Apply cmatrix to each pixel of the image*/
for (irow=0; irow < irows; ++irow ) {
    rowbase = row-1;
    for (icol=0; icol < icols; ++icol) {
        colbase = icol-1;
        /*Loop over convolution matrix*/
        /*Iteration 0: crow=0, ccol=0*/
            x = image[rowbase] [colbase];
            weighted_x = x * 0.0;
            sum = sum + weighted_x;
        /*Iteration 1: crow=0, ccol=1*/
            x = image[rowbase][colbase+1];
            weighted_x = x * 1.0;
            sum = sum + weighted_x;
        /*Iteration 2: crow=0, ccol=1*/
            x = image[rowbase] [colbase+2];
            weighted_x = x * 0.0;
            sum = sum + weighted_x;
        /*Iterations 3–8 follow...*/
        outbuf[irow] [icol] = sum;
}}
    /*End loop over image*/
```

Experimental Results

FIG. 23 is a table identifying applications and kernels that have been dynamically compiled using the system of the present invention and tested against conventional statically-compiled versions of the same. Also included are associated characteristics of the applications and kernels, such as total size, etc. These applications and kernels are representative of the function, size, and complexity of the different types of programs that are currently being targeting for dynamic compilation. All are used in practice in research or production environments. In the table, dinero (version III) is a cache simulator that can simulate caches of widely varying configurations and has been the linchpin of numerous memory subsystem studies since it was developed in 1984. m88ksim simulates the Motorola 88000 and was taken from the SPEC95 integer suite. mipsi is a simulation framework that has been used for evaluating processor designs that range in complexity from simultaneous multithreaded to embedded processors. The set of kernels have been previously used in benchmark suites for other dynamic-compilation systems for C (binary, chebyshev, query, romberg). The kernels are one or two orders of magnitude smaller than the applications and contain dynamic regions that are, excluding m88ksim, roughly two to eight times smaller.

The BTA and the dynamic-compiler generator were implemented in the Multiflow compiler, which is roughly comparable to many of today's standard optimizing compilers. (As a point of reference, dynamic regions in the applications executed on average, 8% more slowly when compiled with Multiflow than with gcc-O2 (a modern compiler); kernels were 7% faster.) Each application was evaluated using a statically-compiled and several dynamically-compiled versions, depending on the optimizations (DyC options) that were turned on. The statically compiled version was compiled by ignoring the annotations in the application source. The same options to Multiflow were used for both the statically and dynamically compiled versions, so that, for example, loops unrolled (by some constant factor) in the statically compiled version are also statically unrolled in the dynamically compiled versions, in addition to any run-time complete loop unrolling.

All programs were executed on a lightly loaded DEC Alpha 21164-based workstation with 1.5 GBytes of physical memory. A single input was used for each application. Mid-sized inputs for the kernels were chosen from the sets of inputs used in the studies in which the benchmarks originally appeared.

Execution times for both the whole programs and their dynamic regions were measured using getrusage (for user time). Whole programs were executed 51 times, with the first run discarded (to reduce systems effects), and the remaining runs were averaged. When timing dynamic regions, most benchmarks invoked their specialized functions many times (tens of thousands of times for the kernels) to overcome the coarseness of the getrusage timer and to minimize cache effects. The time for one invocation was obtained by dividing the average of the measurements by the number of invocations timed. Hardware cycle counters were used to gather processor (user+system) times for dynamic compilation and dispatching overheads, because the granularity of getrusage was also too coarse for these measurements.

Basic performance results for the dynamic regions of both the applications and the kernels are presented in FIG. 24, which includes asymptotic speedups, break-even points, and dynamic compilation overhead. Asymptotic speedup represents the optimal improvement of dynamically compiled code over statically compiled code (excluding dynamic compilation overhead), and is calculated as s/d, the ratio of statically compiled execution cycles (s) over dynamically compiled execution cycles (d). The break-even point is the number of executions of the dynamic region at which statically and dynamically compiled code (including dynamic compilation overhead) have the same execution times; it is calculated as o/(s-d), where o represents cycles of dynamic compilation overhead. Dynamic compilation overhead is measured as cycles per dynamically generated instruction; also included is the number of instructions generated to place the instruction-specific overhead in context.

Asymptotic dynamic region speedups for the applications ranged widely, from 1.2 to 5.0. The higher speedups for mipsi and m88ksim (5.0 and 3.7, respectively) occurred because most of the code in their dynamic regions could be optimized as static computations. Break-even points for the applications are well within normal application usage, showing that the greater efficiency of the dynamically generated code can more than compensate for the dynamic compilation cost. For example, dynamically compiling dinero pays off after simulating only 3524 memory references—typical cache simulation results are obtained by simulating millions or billions of references. Further, mipsi's break-even point depends on the number of reinterpreted instructions (i.e., the number and size of the loops in mipsi's input program) relative to the total size of the input program.

Whole-program speedup due to dynamic compilation depends on the proportion of total run time that is spent executing the dynamic region. In the applications, the percentage of execution time spent in the dynamic region ranged from 9.8% for m88ksim to almost the entire execution for mipsi. Overall application speedup, including the cost of dynamic compilation, was not quite proportional to this fraction of asymptotic speedup (due to cache and other system effects) and ranged from 1.05 to 4.6.

Exemplary Environment for Practicing the Invention

With reference to FIG. 25, a generally conventional personal computer 900 is illustrated, which is suitable for use in connection with practicing the present invention. Alternatively, a corresponding workstation on a local area network, or other computing device may be used for executing machine instructions comprising a computer program that causes the present invention to be executed. Personal computer 900 includes a processor chass is 902 in which are mounted a floppy disk drive 904, a hard drive 906, a motherboard populated with appropriate integrated circuits (not shown), and a power supply (also not shown), as are generally well known to those of ordinary skill in the art. A monitor 908 is included for displaying graphics and text generated by software programs that are run by the personal computer, and for enabling a user to write and debug software programs that are developed using the dynamic-compilation system and method of the present invention. A mouse 910 (or other pointing device) is connected to a serial port (or to a bus port) on the rear of processor chass is 902, and signals from mouse 910 are conveyed to the motherboard to control a cursor on the display and to select text, menu options, and graphic components displayed on monitor 908 by software programs executing on the personal computer. In addition, a keyboard 913 is coupled to the motherboard for user entry of text and commands that affect the running of software programs executing on the personal computer.

Personal computer 900 also optionally includes a compact disk-read only memory (CD-ROM) drive 917 into which a CD-ROM disk may be inserted so that executable files and data on the disk can be read for transfer into the memory and/or into storage on hard drive 906 of personal computer 900. Alternatively, other types of drives used for reading mass storage memory media, such as DVDs can be included. The machine instructions comprising the software program that causes the CPU to implement the functions of the present invention that have been discussed above will likely be distributed on floppy disks, CD-ROMs, or other memory media and stored in the hard drive until loaded into random access memory (RAM) for execution by the CPU.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for automatically processing source code for a computer program to produce machine-executable instructions comprising statically-compiled code portions and specialized code portions, said specialized code portions including dynamically-compiled instructions that are generated at run time when the machine-executable instructions are executed by a processor, comprising the steps of:

(a) defining policies having associated program statements and values for generating said specialized code portions and for integrating said specialized code portions with said statically-compiled code portions;

(b) identifying program points where said specialized code portions may be implemented at run time;

(c) applying the policies to the program points by entering annotations in the source code in proximity to said program points, using the associated program statements;

(d) binding the values to variables; and (e) processing the source code to generate the statically-compiled code portions and to create run-time specializers that dynamically compile the specialized code portions when the specialized code portions are requested to be executed at run-time, based on the values bound to the variables.

2. The method of claim 1, wherein the source code comprises a plurality of procedures, and wherein the step of binding the values to the variables comprises the steps of:

(a) generating a control flow graph representation of each of the plurality of procedures; and (b) iteratively performing a data flow analysis over the control flow graph representation for each procedure to propagate a set of divisions, said divisions mapping the variables to the values in accord with the annotations entered in the source code.

3. The method of claim 2, wherein the data flow analysis produces information associated with each program point that is used to produce the run-time specializers.

4. The method of claim 1, wherein the policies specify parameters for controlling a level of aggressiveness of specialization of said specialized code portions, the level of aggressiveness controlling the extent to which code is duplicated in order to create the specialized code portions.

5. The method of claim 1, wherein the policies specify parameters for controlling caching of said specialized code portions.

6. The method of claim 1, wherein the source code comprises variables that may be static or dynamic at run time, and wherein the step of identifying the program points comprises performing a binding-time analysis based on the policies to identify static variables and dynamic variables at run time.

7. A computer-readable medium having computer-executable instructions for performing the steps recited in claim 1.

8. A method for automatically conditionally specializing source code for a computer program to generate machine-executable instructions that comprise statically-compiled code portions and specialized code portions, said specialized code portions including dynamically-compiled instructions that are generated at run time when the machine-executable instructions are executed by a processor, comprising the steps of:

(a) identifying one or more program points in the source code for implementing the specialized code portions;

(b) annotating the source code in proximity to said one or more program points by entering at least one conditional statement at each program point; and (c) processing each conditional statement so as to direct the generation of a corresponding specialized code portion based on evaluation of the conditional statement.

9. The method of claim 8, wherein the generation of said specialized code portion comprises the steps of:

(a) copying a portion of the source code to be specialized;

(b) apply a binding-time analysis to said portion;

(c) creating a run-time specializer from the copy of the source code portion that was analyzed, said run-time specializer being used to produce a specialized version of the copy at run time; and (d) creating a specializer stub that is prepended to the run-time specializer to control execution of said specialized version of the copy at run time.

10. The method of claim 9, wherein the specializer stub either executes the run-time specializer or causes the previously created specialized version of the copy to be executed.

11. A computer-readable medium having computer-executable instructions for performing the steps recited in claim 8.

12. A method for automatically positioning cache lookups within a specialized computer program, said specialized computer program including a plurality of procedures and comprising statically-compiled code portions and dynamically-compiled code portions, each dynamically compiled code portion being generated at run time when the specialized computer program is executed by a processor, comprising the steps of:

(a) identifying ranges within the dynamically-compiled code portions that include code potentially reusable during execution of the specialized computer program, each range corresponding to a run-time constant and spanning program points between which said run-time constant is in use;

(b) coalescing the ranges identified by forming intersections between ranges that span common program points; and (c) placing the cache lookups within the ranges that have been coalesced.

13. The method of claim 12, further comprising the step of performing a binding-time analysis that identifies the dynamically-compiled code portions and implements the step of identifying the ranges within said dynamically-compiled code portions.

14. The method of claim 12, wherein the step of identifying the ranges comprises the steps of:

(a) identifying points in the dynamically-compiled code portions in which code may be reused, each identified point corresponding to a procedure and having a program-control dependency; and (b) for each identified point, constructing a range over said point's associated procedure in which said point can be moved while maintaining its program-control dependency.

15. The method of claim 12, further comprising the steps of:

(a) promoting a run-time constant if its value has changed since a previous execution of a code portion within a range corresponding to the run-time constant; and (b) evicting a run-time constant after it is no longer used by a dynamically-compiled code portion, wherein the placement of a cache lookup is dependent on a relative mix of variables within a range that has been coalesced such that if a relative majority of the variables are promoted, the cache lookup is placed at an end of said range, and if a relative majority of the variables are evicted, the cache lookup is placed at a start of said range.

16. A method for automatically enabling on-demand specialization to be produced across arbitrary control flow edges in a computer program comprising source code processed to generate machine-executable instructions, said machine instructions comprising statically-compiled code portions and specialized code portions, said specialized code portions including dynamically-compiled instructions that are generated at run time when the machine instructions are executed by a processor, comprising the steps of:

(a) generating a control flow graph of the computer program, the control flow graph comprising pairs of blocks of code and edges, wherein each pair of blocks includes a source block connected by an edge to a destination block, and wherein the edge contains no source code;

(b) generating a specialized source block based on any variables expected to be constant during the run-time execution of said source block; and (c) replacing an edge that connects the specialized source block to a destination block with code that generates a stub immediately after the specialized source block, the stub, when executed, gathering values for variables that comprise a context of specialization for the destination block, and invoking a routine to create a specialized destination block with respect to the context.

17. The method of claim 16, wherein the stub, when executed, provides a direct branch from the specialized source block to the specialized destination block so that the stub is bypassed during future run-time traversals of the edge connecting the specialized source block with the specialized destination block.

18. A system for automatically processing a computer program comprising source code to generate machine-executable instructions, said machine-executable instructions including statically-compiled code portions and specialized code portions, said specialized code portions including dynamically-compiled instructions that are generated at run time when the machine-executable instructions are executed, comprising:

(a) a memory in which a plurality of machine instructions are stored; and (b) a processor, coupled to the memory and responsive to the machine instructions, the machine instructions, when executed by the processor, causing the processor to:

(i) enable a user to annotate the source code with program statements corresponding to predefined policies, which are stored in the memory, said policies having associated values that define directions for generating said specialized code portions and for integrating said specialized code portions with said statically-compiled code portions, the program statements being introduced in the source code so as to operate on associated run-time constant variables;

(ii) bind the associated values to variables; and (iii) process the source code to generate the statically-compiled code portions and to create run-time specializers, said run-time specializers comprising extensions that dynamically compile the specialized code portions when said specialized code portions are requested to be executed at run time, based on the values bound to the variables.

19. The system of claim 18, wherein the source code comprises a plurality of procedures and wherein execution of said machine instructions causes the processor to propagate binding the values to the variables by:

(a) generating a control flow graph representation of each of the procedures; and (b) iteratively performing a data flow analysis over each control flow graph representation to propagate a set of divisions, said divisions mapping the variables to the values based on the program statements introduced into the source code.

20. The system of claim 18, wherein the policies specify parameters for controlling caching of said specialized code portions.

* * * * *

UNITED STATES PATENT AND TRADEMARK OFFICE
CERTIFICATE OF CORRECTION

PATENT NO. : 6,427,234 B1
DATED : July 30, 2002
INVENTOR(S) : Chambers et al.

It is certified that error appears in the above-identified patent and that said Letters Patent is hereby corrected as shown below:

Column 1,
Line 12, before the section "Field of the Invention" please add the following Government Rights section heading and paragraph:
-- Government Rights
This invention was made with government support under Department of the Navy Grant Nos. N00014-94-1-1136 and N00014-92-1-0402. The government has certain rights in the invention. --

Column 2,
Line 23, " "C," " should read -- "`C," --
Line 24, ""`C:" should read -- "`C: --
Line 35, "$23_{rd}$" should read -- $23^{rd}$ --

Column 16,
Line 62, "$A \rightarrow B($ Pow$(A \times B)$." should read -- $A \rightarrow B \subseteq$ Pow$(A \times B)$. --

Column 21,
Line 22, "AutoPromote $\leqq_{PromotionPolicy}$ ManualPromote" should read -- AutoPromote $\leq_{PromotionPolicy}$ ManualPromote --
Line 31, "Divisioninfo" should read -- DivisionInfo --
Line 39, "$rvs_i$" should read -- $rvs_1$ --

Column 27,
Line 18, "we" should read -- $w_e$ --

Column 31,
Line 26, "$E_2$" should read -- $E_{12}$ --

Column 36,
Line 5, "§" should read -- | | --

UNITED STATES PATENT AND TRADEMARK OFFICE

CERTIFICATE OF CORRECTION

PATENT NO. : 6,427,234 B1
DATED : July 30, 2002
INVENTOR(S) : Chambers et al.

It is certified that error appears in the above-identified patent and that said Letters Patent is hereby corrected as shown below:

Column 39,
Line 40, “chass is” should read -- chassis --
Line 51, “chass is” should read -- chassis --

Signed and Sealed this

Fourth Day of February, 2003

JAMES E. ROGAN
*Director of the United States Patent and Trademark Office*